United States Patent
Suzuki et al.

(10) Patent No.: US 6,266,956 B1
(45) Date of Patent: Jul. 31, 2001

(54) EXHAUST EMISSION CONTROL SYSTEM OF HYBRID CAR

(75) Inventors: Makoto Suzuki; Hideo Kobayashi; Kotaro Hayashi, all of Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/469,037

(22) Filed: Dec. 21, 1999

(30) Foreign Application Priority Data

Dec. 22, 1998 (JP) ................................................. 10-365760

(51) Int. Cl.⁷ ................................................. F02M 25/06
(52) U.S. Cl. ................................ 60/278; 60/284; 60/299; 60/300; 60/303; 180/65.2
(58) Field of Search ............................. 60/278, 284, 303, 60/307, 299, 300; 180/65.4, 65.2, 309

(56) References Cited

U.S. PATENT DOCUMENTS

| | | | |
|---|---|---|---|
| 4,749,028 | * 6/1988 | Okura et al. | 123/550 |
| 4,858,825 | 8/1989 | Kawamura . | |
| 4,927,077 | 5/1990 | Okada . | |
| 5,482,020 | * 1/1996 | Shimizu et al. | 123/417 |
| 5,758,490 | * 6/1998 | Maki et al. | 60/285 |
| 5,937,639 | * 8/1999 | Sasaki et al. | 60/278 |
| 5,950,420 | * 3/2000 | Geiger | 60/278 |
| 5,964,088 | * 10/1999 | Kinugasa et al. | 60/286 |
| 6,032,753 | * 3/2000 | Yamazaki et al. | 60/65.2 |
| 6,041,591 | * 3/2000 | Kaneko et al. | 60/285 |
| 6,059,057 | * 5/2000 | Yamazaki et al. | 60/286 |
| 6,131,538 | * 10/2000 | Kanai | 180/65.2 |

FOREIGN PATENT DOCUMENTS

| | | |
|---|---|---|
| 44 11 959 | 10/1995 | (DE) . |
| 0511654 | * 11/1992 | (EP) . |
| 1 497 428 | 12/1967 | (FR) . |
| 2 381 175 | 8/1980 | (FR) . |
| 1 595 060 | 12/1970 | (GB) . |
| 2 041 081 | 9/1980 | (GB) . |
| 55-160158 | 12/1980 | (JP) . |
| 6-117225 | 6/1994 | (JP) . |
| 06 222 867 | 8/1994 | (JP) . |

OTHER PUBLICATIONS

Co–pending U.S. Patent Application Serial No. 09/216,051, filed Dec. 16, 1998.

* cited by examiner

Primary Examiner—Thomas Denion
Assistant Examiner—Diem Tran
(74) Attorney, Agent, or Firm—Kenyon & Kenyon

(57) ABSTRACT

An exhaust emission control system of a hybrid car capable of relieving a load upon an engine fuel injection device by eliminating a use of sub-injection and recovering from S-poisoning as well as purifying an exhaust gas even by eliminating the use of sub-injection. The exhaust emission control system of an internal combustion engine, used for the hybrid car traveled by two types of power sources of a diesel engine and an electric motor, includes a combustion heater as separate body from the engine, a catalyst, provided in an exhaust passageway, for purifying an engine exhaust gas, a combustion gas passageway through which a combustion gas emitted from the combustion heater flows toward the catalyst, and a three-way valve for introducing the combustion gas to the catalyst via the combustion gas passageway or an EGR passageway when the diesel engine is in a stop state and when the electric motor is in a driving state.

5 Claims, 11 Drawing Sheets

EXHAUST EMISSION CONTROL SYSTEM OF HYBRID CAR

BACKGROUND OF THE INVENTION

1. Field of the Invention

The present invention relates generally to an exhaust emission control system of a hybrid car, and more particularly to an exhaust emission control system relative to an internal combustion engine of the hybrid car provided with two types of power sources such as an internal combustion engine and an electric motor and traveled by optimally combining driving forces generated by these two types of power sources corresponding to a condition.

2. Related Background Art

A hybrid car also adopts an internal combustion engine, such as a gasoline direct-injection lean burn engine and a diesel engine etc, exhibiting a high thermal efficiency and producing small quantities of hydrocarbon and carbon monoxide with an excessive oxygen in an atmosphere in an exhaust system.

For example, an occlusion reduction type lean NOx catalyst may be one of catalysts used in the exhaust system as an element for purifying an exhaust gas of the internal combustion engine described above. This occlusion reduction type lean NOx catalyst is categorized as an intermittent processing type lean NOx catalyst for temporarily occluding nitrogen oxide in a lean atmosphere; and, after being thereafter supplied with a proper amount of reducing agent, thereby promptly performing reduction-purging of the occluded nitrogen oxide. Note that there is a selective reduction type lean NOx catalyst other than the occlusion reduction type lean NOx catalyst. This catalyst is a consecutive processing type lean NOx catalyst which consecutively effecting selective reduction purging of the nitrogen oxide, by supplying a reduction agent. Further, hydrocarbon may be exemplified as a reducing agent as shown in, e.g., Japanese Patent Application Laid-Open Publication No. 6-117225. Moreover, carbon monoxide other than the hydrocarbon is known as a reducing agent.

When the hydrocarbon is used as the reducing agent, some proportion of the hydrocarbon is partially oxidated to produce an activated species. Then, this activated species reacts to the nitrogen oxide and reduces it, thereby producing nitrogen, hydrogen, oxygen and carbon dioxide which are harmless to a human body.

Further, the hydrocarbon is a main component constituting gasoline and a light oil serving as a fuel of the internal combustion engine. Hence, the supply of the hydrocarbon as the reducing agent to the lean NOx catalyst implies nothing but to supply the internal combustion engine with an extra fuel, apart from supplying the gasoline, the light oil and other internal combustion engine fuels for driving the engine as an essential use thereof. Note that the gasoline, the light oil and other internal combustion engine fuels are referred to as "fuels for combustion", as far as they are not particularly specified.

Then, according to the technology disclosed in the above Publication, the above extra supply is, separately from the supply through an injection at an expansion stroke by an engine fuel injection device such as an injector etc as normally done in the internal combustion engine, carried out at the expansion and exhaust strokes by the injection of the same engine fuel injection device. Then, of these injections, the former injection for driving the engine is called a main injection, and the other latter injection is called a sub-injection.

As described above, according to the prior art, both of the main injection and the sub-injection are performed by use of the same engine fuel injection device, and hence a greater number of injections are carried out by the engine fuel injection device than in the case of effecting only the main injection. Accordingly, a load on the engine fuel injection device increases, which might cause a fault in the engine fuel injection device.

Further, the hybrid car is provided with two types of power sources such as the internal combustion engine and the electric motor as explained above, and takes such a system as to travel by an optimum combination of the driving forces given from the two types of power sources corresponding to a condition. Therefore, the power source during the traveling of the vehicle may take three modes in which only the electric motor works, only the internal combustion engine works, and both of these two power sources work. Note that the driving of the internal combustion engine implies that the engine itself works by itself through four operating strokes; intake stroke, compression stroke, expansion (explosion) stroke, and exhaust stroke.

Generally, effective functioning of the catalyst requires activation of the catalyst, and, for attaining this function, the catalyst must be warmed up to a temperature enough to effectively make the catalyst function, i.e., up to a so-called activation temperature. Then, in a vehicle mounted with a conventional internal combustion engine, the temperature of catalyst is raised by utilizing the heat of exhaust gas emitted from the internal combustion engine. However, an exhaust gas is not produced during a halt of the internal combustion engine and, therefore the exhaust gas does not flow to the catalyst. Hence, heretofore, the catalyst becomes able to function effectively only after starting of operation of the internal combustion engine, and the catalyst could not have been warmed up to an activated temperature while the internal combustion engine was in a halt state, before starting the operation of the internal combustion engine. Thus, it can be assumed that the catalyst is not in the activation temperature immediately after the start of operation of the internal combustion engine.

This can be said for an internal combustion engine mounted on a hybrid car, that is, it is highly possible that the catalyst is not in the activated temperature immediately after starting of the operation of the engine. In this case, therefore, it may be possible that the catalyst cannot function effectively as exhaust gas purifying means for a while until it is activated. Further, if the hybrid car adopts the internal combustion engine, such as a direct injection engine and a diesel engine, exhibiting a high thermal efficiency and producing small quantities of hydrocarbon and carbon monoxide with an excessive oxygen in an atmosphere in an exhaust system, and when, for instance, the internal combustion engine is in an operation state such as a light load region, an exhaust gas temperature at that time is low with the result that heat enough to activate the catalyst is not transferred to the exhaust system, and on the contrary it might happen that the catalyst is cooled by a low-heat exhaust gas. Further, if there are the small quantities of hydrocarbon and carbon monoxide and the excessive oxygen in the atmosphere in the exhaust system, and further if the exhaust gas temperature is low, it is difficult to recover from S-poisoning of the catalyst.

Such being the case, if the atmosphere in the exhaust system is enriched by applying an external load to the internal combustion engine in order to increase the exhaust gas temperature for the purpose of purifying the exhaust gas and recovering the S-poisoning of the catalyst by activating the catalyst, this in turn becomes a factor for deteriorating a fuel consumption, and besides particulate matters might be produced.

SUMMARY OF THE INVENTION

It is a primary object of the present invention, which was devised under such circumstances, to provide an exhaust emission control system of a hybrid car, capable of providing, for example, the following effects. ① To relieve a load exerted on an engine fuel injection device by eliminating a use of a sub-injection. ② Can supply a reducing agent such as a hydrocarbon and the like to a catalyst even by eliminating the use of the sub-injection. ③ Can sufficiently raise a temperature of an exhaust system before starting up the engine so that the catalyst provided in the exhaust system of the internal combustion engine effectively functions upon a start-up of the internal combustion engine. ④ Well performs both purification of an exhaust gas and a recovery from S-poisoning of the catalyst. ⑤ Restrains particulate matters from being produced.

To accomplish the above object, according to a first aspect of the present invention, an exhaust emission control system of an internal combustion engine, used in a hybrid car traveled by two types of power sources such as an internal combustion engine and an electric motor, comprises a combustion device working as a separate device from the internal combustion engine, a catalyst, provided in an exhaust passageway of the internal combustion engine, for purifying an exhaust gas emitted from the internal combustion engine, a combustion gas passageway for passing therethrough the combustion gas emitted from the combustion device toward the catalyst, and an introducing mechanism for the combustion gas to the catalyst via the combustion gas passageway when the internal combustion engine is a predetermined operation state.

"The internal combustion engine" includes not only a normal port injection gasoline engine but also internal combustion engines producing the small quantities of the hydrocarbon and carbon monoxide and the excessive oxygen in the atmosphere in the exhaust system, such as a gasoline direct-injection lean burn engine and a diesel engine or a CNG (Compressed Natural Gas) engine etc.

"The combustion device as a separate device", which is a combustion oriented device attached to the internal combustion engine as a separate body from the internal combustion engine body, performs its peculiar combustion without being influenced at all by the combustion within cylinders of the internal combustion engine body, and thereby discharges the combustion gas. It is desirable to have the combustion device separately from the internal combustion engine body due to the necessity for increasing a temperature of an engine exhaust system before starting up the engine.

What is preferable as "the combustion gas" may be a gas containing as its components hydrocarbon and carbon monoxide etc according to the necessity, and it is therefore preferable to use an internal combustion engine fuel such as a gasoline and a light oil as a fuel for combustion of the combustion device. Since the gasoline is composed of the hydrocarbon etc, and hence, if not completely burned, the hydrocarbon and the carbon monoxide are easy to produce in an unburned gas.

"The combustion gas passageway" may take any forms on condition that combustion heat evolved from the combustion device is transferred to the catalyst, however, a discharge port of the combustion gas passageway is preferably disposed in the engine exhaust passageway so that the combustion gas can be fed anterior to the catalyst provided in the engine exhaust passageway. Then, it is desirable that the combustion gas passageway be used for only warming the catalyst without the combustion heat escaping anywhere for the duration of the combustion gas flowing through the combustion gas passageway.

"The introducing mechanism" serves to introduce the combustion gas emitted from the combustion device into the combustion gas passageway or hinder the introduction thereof, and preferably has an opening/closing valve for opening and closing the combustion gas passageway. Further, the introducing mechanism, of which an operation is controlled by a CPU (Central Processing Unit) of an ECU (Engine Control Unit), thereby introduces the combustion gas emitted from the combustion device to the catalyst via the combustion gas passageway.

According to a second aspect of the invention, in the exhaust emission control system of the hybrid car according to the first aspect, the time when the internal combustion engine is in the predetermined operation state may be such as, e.g., the internal combustion engine being in a stop state.

"The internal combustion engine being in the stop state" implies that the internal combustion engine does not work by itself.

In the case of applying an EGR (Exhaust Gas Recirculation) passageway to the combustion gas passageway, it is preferable that the introducing mechanism be an EGR valve.

In the exhaust emission control system of the hybrid car according to the present invention, when the internal combustion engine is in the predetermined operation state, e.g., in the stop state, the combustion gas emitted from the combustion device flows through the combustion gas passageway under the control of the introducing mechanism, and arrives at a portion provided with the catalyst in the engine exhaust system.

Accordingly, the combustion gas emitted from the combustion device can be flowed in to the catalyst during a period for which the vehicle travels by only the electric motor. Hence, if the engine exhaust system need to purify the exhaust gas and recover from S-poisoning of the catalyst, the car travels only by driving of the electric motor by positively stopping the internal combustion engine. With this contrivance, no exhaust gas emits from the internal combustion engine, and therefore, if a temperature of the engine exhaust gas is low, it never happens that the catalyst is cooled by this low-temperature exhaust gas as seen in the prior art. Namely, the catalyst is warmed promptly up to an activation temperature simply because of receiving the heat from the high-heat combustion gas, evolved from the combustion device, for warming the catalyst.

Furthermore, the catalyst temperature can be set high beforehand by the combustion heat which has already been evolved from the combustion device when the engine was operated. For example, since the combustion gas emitted from the combustion device can be flowed in to the catalyst during a low-speed traveling of the car by only the electric motor, even in an initial stage where both of the electric motor and the internal combustion engine are driven and even the internal combustion engine just starts its actuation and a temperature of the exhaust gas emitted therefrom is low, the catalyst temperature has been already set high in advance, when the internal combustion engine starts operating, by the combustion heat that has already been evolved from the combustion device. Accordingly, in such a case, the catalyst can be warmed in a well-activated state when starting up the internal combustion engine, and hence it is possible to purify the exhaust gas and perform the recovery from the S-poisoning of the catalyst, corresponding to the start-up of the internal combustion engine. Besides, if a combustion state of the combustion device is adjusted so that the exhaust gas emitted from the combustion device contains proper amounts of hydrocarbon and carbon monoxide, it is feasible to ensure the hydrocarbon and carbon monoxide a enough to purify the emission and to make the recovery from the S-poisoning of the catalyst without requiring the sub-injection as hitherto used in the prior art. Then, in the case of using the lean NOx catalyst, this catalyst purges the nitrogen oxide from the exhaust gas when the exhaust system is in the lean state.

Moreover, the heat of the combustion gas evolved from the combustion device is utilized for increasing the temperature of the exhaust system in order to activate the catalyst, and hence the catalyst can be activated especially by applying an external load to the internal combustion engine without enriching an atmosphere of the exhaust system. Therefore, an exhaust gas purifying efficiency of the catalyst increases. Further, since the external load may not be applied to the internal combustion engine, a quantity of unburned component decreases, so that a production of particulate matters can be restrained. Then, even if the particulate matters adhere to the lean NOx catalyst, the particulate matters can be purged from the lean NOx catalyst by burning the particulate matters by dint of the combustion gas heat of the combustion device.

According to a third aspect of the invention, in the exhaust emission control system of the hybrid car according to the first aspect, the combustion device is preferably a combustion heater having a combustion gas discharge passageway for discharging the combustion gas to an intake system of the internal combustion engine. What is preferable as the combustion device is the one including a combustion chamber body and an air supply passageway through which the air for combustion is supplied from an intake pipe of the internal combustion engine. Hence, in this case, the combustion device has a stretch of air flow passageway consisting of the air supply passageway, the combustion chamber body and the combustion gas discharge passageway.

According to a fourth aspect of the invention, in the exhaust emission control system of the hybrid car according to the third aspect, the catalyst is preferably a lean NOx catalyst. The lean NOx catalyst may be either an occlusion reduction type lean NOx catalyst or a selective reduction type lean NOx catalyst.

According to a fifth aspect of the invention, in the exhaust emission control system of the hybrid car according to the first through fourth aspects, it is preferable that the combustion gas passageway is an EGR passageway, and the introducing mechanism is an EGR valve.

According to a sixth aspect of the invention, in the exhaust emission control system of the hybrid car according to the first through fourth aspects, the combustion gas passageway bypasses the internal combustion engine and extends anterior to the catalyst, and the introducing mechanism is preferably a switching valve for switching over a flow of the combustion gas emitted from the combustion device to the side of the internal combustion engine and to the side of the combustion gas passageway.

According to a seventh aspect of the invention, in the exhaust emission control system of the hybrid car according to the first aspect, it is preferable that the introducing mechanism, when the internal combustion engine is in the stop state and when the electric motor is in a driving state, introduces the combustion gas to the catalyst via the combustion gas passageway.

According to an eighth aspect of the invention, in the exhaust emission control system of the hybrid car according to the first aspect, the time when the internal combustion engine is in the predetermined operation state may be exemplified such as when the internal combustion engine is in the driving state in addition to when the internal combustion engine is in the stop state, and what is preferable as a combustion gas passageway is the one that lets the combustion gas emitted from the combustion device towards anterior to the catalyst. The combustion gas passageway has the introducing mechanism for introducing the combustion gas to the catalyst via the combustion passageway.

In that case, when the internal combustion engine is in the driving state, the combustion gas emitted from the combustion device flows anterior to a portion provided with the catalyst in the engine exhaust system via the combustion gas passageway under the control of the introducing mechanism.

Accordingly, the combustion gas emitted from the combustion device can be flowed anterior to the catalyst during the driving of the internal combustion engine. Further, if a radiation member is not interposed in the combustion gas passageway so that the heat held by the combustion gas is used only for warming the catalyst without letting the heat escape anywhere during a period of the combustion gas flowing through the combustion gas passageway, the heat is not absorbed correspondingly from the combustion gas, and is therefore capable of effectively warming the catalyst.

Therefore, after starting up the internal combustion engine, it is possible to purify the emission and perform the recovery from the S-poisoning of the catalyst soon corresponding thereto. Besides, if the combustion state of the combustion device is adjusted so that the exhaust gas emitted from the combustion device contains the proper amounts of hydrocarbon and carbon monoxide, it is feasible to ensure the hydrocarbon and carbon monoxide enough to purify the emission and to make the recovery from the S-poisoning of the catalyst without requiring the sub-injection as hitherto used in the prior art. Then, in the case of using the lean NOx catalyst, this catalyst purges the nitrogen oxide from the exhaust gas when the exhaust system is in the lean state.

According to a ninth aspect of the invention, in the exhaust emission control system of the hybrid car according to the eighth aspect, it is preferable that the introducing mechanism be a switching valve for switching over a flow of the combustion gas emitted from the combustion device to the side of the internal combustion engine and to the side of the combustion gas passageway.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Embodiments of an exhaust emission control system of a hybrid car according to the present invention will hereinafter be described with reference to the accompanying drawings.

FIRST EMBODIMENT

A first embodiment of the present invention will be discussed referring to FIGS. 1–3.

(Outline of System Architecture of Hybrid Car)

Figure 1:
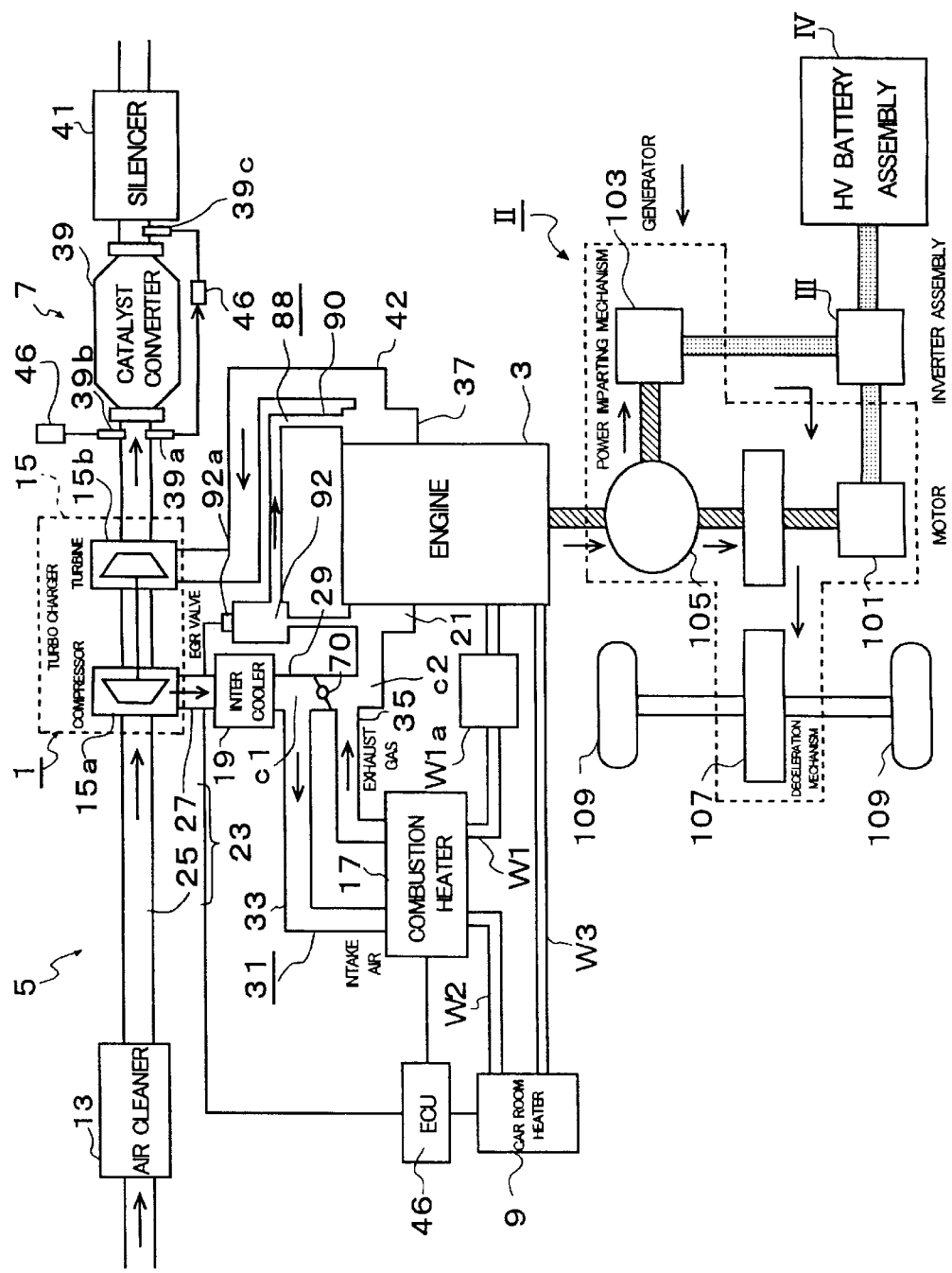
FIG. 1 is a schematic diagram showing a construction an internal combustion engine having a combustion heater in a first embodiment of the present invention.
Figure 2:
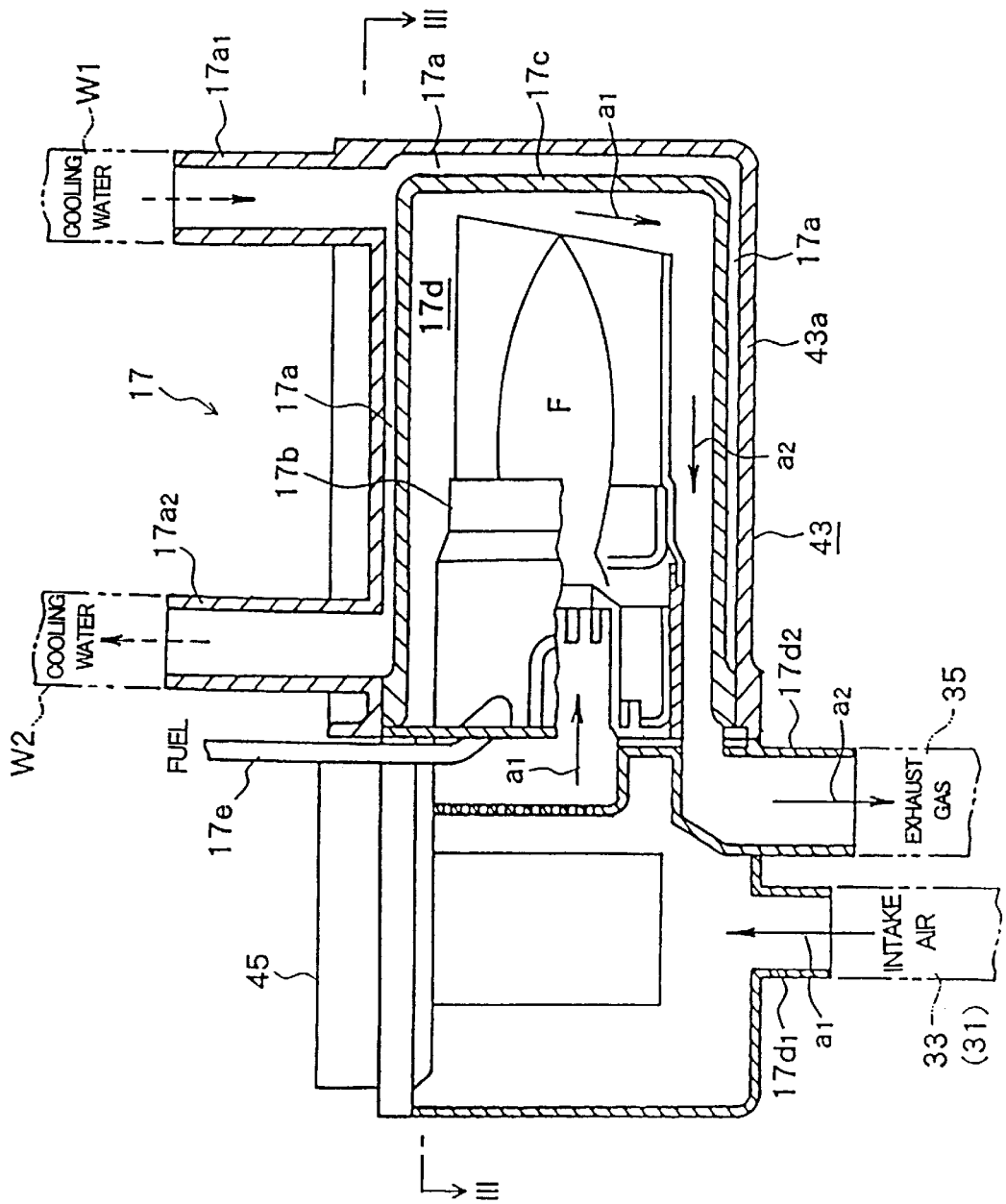
FIG. 2 is a sectional view schematically showing the combustion heater.

What is shown in FIG. 1 is a system architecture of a hybrid car which travels by two types of power sources of an engine and a motor. This system architecture includes a diesel engine I functioning as a main power source of the hybrid car, a hybrid-oriented Trans-axle II including an electric motor 101 functioning likewise as a sub-power source, an inverter III for controlling the electric power to the electric motor 101, and a battery IV for supplying and collecting the electric power by a predetermined voltage. Note that neither the inverter III nor the battery IV is related directly to the present invention, of which detailed explanations are therefore omitted, and the diesel engine I and the hybrid-oriented Trans-axle II will hereinafter be discussed in details.

(Diesel Engine I)

A diesel engine 1 serving as an internal combustion engine has an engine body 3 equipped with a water jacket containing engine cooling water, an air intake device 5 for supplying a plurality of unillustrated cylinders of the engine body 3 with the air needed for combustion, an exhaust device 7 for discharging into the atmosphere an exhaust gas produced after an air-fuel mixture has been burned, and a car room heater 9 for warming the interior of a room of a vehicle mounted with the engine. Note that the diesel engine is referred simply to as an "engine", as far as it is not particularly specified.

(Air Intake Device 5)

The air intake device 5 structurally starts with an air cleaner 13 for filtering the outside air and terminates with an unillustrated intake port within the engine body 3. From the air cleaner 13 down to the intake port, the air intake device 5 is provided with a compressor 15a of a turbo charger 15, an inter cooler 19, and an intake manifold 21 for allocating the air coming via the inter cooler 19 to the respective cylinders.

Then, the component members of the air intake device 5 are connected by a plurality of connecting pipes belonging to an intake pipe 23, which will be described later on.

(Intake Pipe 23)

The intake pipe 23 is roughly divided, at the compressor 15a, into a downstream-sir connecting pipe 27 brought into a pressurized state with the forcibly intruded outside air which has entered the air intake device 5 from the air cleaner 13, and an upstream-side connecting pipe 25 not brought into the pressurized state.

(Upstream-Side Connecting Pipe 25)

The upstream-side connecting pipe 25 is a connecting pipe extending straight in bilateral directions between the air cleaner 13 and the compressor 15a.

(Downstream-Side Connecting Pipe 27)

The downstream-side connecting pipe 27 is constructed of a mainstream pipe 29, taking substantially an L-shape and extending in up-and-down directions in FIG. 1, for connecting the compressor 15a to the intake manifold 21, and of a heater branch pipe 31 as a tributary pipe connected in bypass to the mainstream pipe 29.

(Branch Pipe 31 for Heater)

The branch pipe 31 for the heater embraces the combustion heater 17 disposed midways of this pipe 31. The branch pipe 31 for heater is constructed of an air supply passageway 33 for supplying the combustion heater 17 with the air as well as for connecting an upstream-side portion of the combustion heater 17 to the mainstream pipe 29, and of a combustion gas discharge passageway 35 for discharging a combustion gas emitted from the combustion heater 17 into the mainstream pipe 29 as well as for connecting a downstream-side portion of the combustion heater 17 to the mainstream pipe 29. Further, with respect to individual connecting points C1, C2 of the air supply passageway 33 and the combustion gas introducing passageway 35 to the mainstream pipe 29, the connecting point C1 is disposed more upstream of the mainstream pipe 29 than the connecting point C2.

(Components Peripheral to Connecting Points C1 and C2)

Further, the inter cooler 19 is provided between the connecting point C1 and the compressor 15a, and an intake throttle valve 70 is provided between the connecting points C1 and C2 along the mainstream pipe 29.

(Inter Cooler 19)

The inter cooler 19 cools off the air receiving the heat from the compressor 15a and existing more downstream than a portion provided with the compressor 15a.

(Intake Throttle Valve 70)

An unillustrated CPU of an ECU 46 controls an operation of the intake throttle valve 70. Further, the intake throttle valve 70 throttles the mainstream pipe 29 when the engine I is in a stop state and when it is necessary to operate the combustion heater 17. Moreover, an output of the engine I is controlled and the engine I is positively stopped by throttling the intake throttle valve 70. Note that the intake throttle valve 70 is structured to open just when and after starting up the engine I.

The inlet air flowing through the mainstream pipe 29 is separated into the inlet air diverging, at the connecting point C1, to the branch pipe 31 for heater, and the inlet air flowing downstream directly without diverging. The diverging inlet air entering the heater branch pipe 31 flows via the air supply passageway 33—the combustion heater 17—the combustion gas discharge passageway 35, and in the meantime receives the heat from the combustion heater 17, thus bearing the high heat. The high-heat inlet air flows at the connecting point C2 back to the mainstream pipe 29, and becomes confluent with the non-diverging inlet air, thereby increasing a temperature of the inlet air entering the engine body 3.

(Exhaust Device 7)

The exhaust device 7 structurally starts with an unillustrated exhaust port in the engine body 3 and terminates with a silencer 41. From the exhaust port down to the silencer 41, the exhaust device 7 is provided with an exhaust manifold 37, a turbine 15b of the turbo charger 15 and an occlusion reduction type lean NOx catalyst 39 for purifying the exhaust gas of the engine I along an exhaust pipe 42. It is to be noted that the occlusion reduction type lean NOx catalyst is hereinafter simply called a "catalyst", so far as it is not particularly specified.

An inlet NOx sensor 39a and a temperature sensor 39b for measuring a temperature of an inlet gas entering the catalyst 39, are attached to an inlet of the catalyst 39, and an outlet NOx sensor 39c is attached to an outlet of the catalyst 39. These sensors are electrically connected to the CPU of the ECU 46, and output values outputted from the sensors are converted into electric signals and thus transmitted to the CPU.

(EGR 88)

The engine body 3 is provided with an EGR device 88 for flowing some of the exhaust gas back to the induction system. The EGR 88 has an EGR passageway 90 for connecting in bypass the exhaust manifold 37 of the exhaust pipe 42 and the intake manifold 21 of the intake pipe 23, to unillustrated cylinders of the engine body 3.

The EGR passageway 90 has an EGR valve 92 for controlling a quantity of a gas flowing through this EGR passageway 90.

The EGR valve 92 is electrically connected to the CPU of the ECU 46, and is driven by an electric motor 92a. The EGR valve 92 is a valve constructed to originally open under the control of the CPU when the engine I operates and when requested, as well as being a variable controllable valve which opens also when the engine I is in the stop state and when required to operate the combustion heater 17. Further, the EGR valve 92 may also be defined as an introduction mechanism for introducing the combustion gas from the combustion heater 17 to the catalyst 39 via the EGR passageway 90.

As described above, the EGR valve 92 opens when the engine I is in the stop state and when required to operate the combustion heater 17, at which time the combustion gas emitted from the combustion heater 17 is flowed to the exhaust pipe 42 from the intake pipe 23. Hence, the EGR passageway 90 may also be called a combustion gas passageway through which the combustion gas emitted from the combustion heater 17 flows toward the catalyst 39.

Note that the EGR passageway 90 may also be defined as a passageway for connecting in bypass to the engine cylinders a portion, disposed more downstream than the portion provided with the combustion heater 17, of the mainstream pipe 29 of the intake pipe 23, and a portion, disposed more upstream than the portion provided with the catalyst 39, of the exhaust pipe 42.

(Combustion Heater 17)

The combustion heater 17 is a combustion device attached to the engine I as a separate device from the engine body 3, and performs the combustion independently without being influenced at all by the combustion within the unillustrated cylinders of the engine body 3.

Further, the combustion heater 17 operates when the engine I is not only in the stop state but also in a predetermined operation state, and the CPU controls the operation of the combustion heater 17.

The "time when the engine I is in the predetermined operation state" implies, for example, a condition that the car room needs warming and a temperature of cooling water is low. When the engine I is under this condition, regardless of whether or not the engine I operates, this implies "a time when the combustion heater 17 is required to operate" and, in other words, "a time when an operation executing condition of the combustion heater 17 is established". It is the CPU that makes a judgement of its being "when the combustion heater 17 is required to operate". The CPU judges that it is "when the combustion heater 17 is required to operate", based on a variety of electric signals detected in every operation state of the engine by a variety of sensors provided in the engine I regardless of whether or not these sensors are illustrated in the Figure and transmitted to the ECU 46. The CPU, when judging that it is "when the combustion heater 17 is required to operate", operates the combustion heater 17, and the high-heat combustion gas is emitted from the combustion heater 17 and supplied for warming up the engine.

Furthermore, the combustion heater 17 is originally a device for raising a temperature of the engine cooling water in order to warm the car room and the engine as well, and also functions, according to the present invention, as a device for purifying the exhaust gas by activation of the catalyst 39 and for attempting a recovery from S-poisoning of the catalyst 39. This will be explained in sequence later on.

(Outline of Structure of Combustion Heater 17)

Next, a structure of the combustion heater 17 will be outlined.

The combustion heater 17 is connected to the water jacket containing the engine cooling water. Therefore, the combustion heater 17 includes inside a cooling water passageway 17a through which the engine cooling water flows. This cooling water passageway 17a is warmed by the combustion gas flowing through a combustion chamber 17d serving as a heat source. The combustion chamber 17d is, with a combustion cylinder 17b being disposed therein, formed by covering this combustion cylinder 17b with a cylindrical partition wall 17c.

(Combustion Chamber Body 43)

The combustion chamber 17d is defined inside a case body 43a by covering the combustion cylinder 17b with the partition wall 17c, and the cooling water passageway 17a is formed between an internal surface of the case body 43a and an external surface of the partition wall 17c. What includes the case body 43a and the cooling water passageway embraced by this case body 43a, is a combustion chamber body designated by the numeral 43.

(Air Flow Passageways of Combustion Heater)

Further, the air supply passageway 33 and the combustion gas discharge passageway 35 are, though categorized as tributary pipes of the mainstream pipe 29, applied to only the combustion heater 17 and function as air flow passageways for supplying the air for combustion and discharging the combustion gas. Based on a recognition of this function, these passageways 33, 35 may be conceived as components of the combustion heater 17 as well as of the combustion chamber body 43.

(Combustion Chamber 17d)

The combustion chamber 17d functions as an air passageway within the combustion heater 17 and is therefore connected at an air supply port 17d1 and an exhaust gas discharge port 17d2 respectively to the air supply passageway 33 and the combustion gas discharge passageway 35 of the combustion heater 17. Then, as already described above, the inlet air, after diverging from the mainstream pipe 29 and flowing via the heater branch pipe 31, as indicated by solid line arrowheads in FIG. 2, flows via the air supply passageway 33—the combustion chamber 17d—the combustion gas discharge passageway 35, and further flows, assuming an as-combustion-gas-contained state, back to the mainstream pipe 29. Subsequently, this inlet air, which has been warmed by the combustion heat of the combustion gas, is discharged from the combustion chamber body 43 via a route indicated by the above solid line arrowhead, during which the cooling water flowing through the cooling water passageway 17a is warmed by the thus warmed inlet air serving as a thermal medium. Hence, the combustion chamber 17d may also be referred to as a heat-exchange passageway.

(Combustion Cylinder 17b)

The combustion cylinder 17b is structured to supply a combustion fuel through a fuel supply pipe 17e as a fuel supply passageway. When the combustion fuel is supplied to the combustion chamber 17d therefrom, this fuel is vaporized within the combustion chamber body 43. Then, this vaporized fuel is ignited by an unillustrated ignition device, thus burning the vaporized fuel.

(Cooling Water Passageway 17a)

On the other hand, the cooling water passageway 17a has a cooling water introducing port 17a1 and a cooling waster discharge port 17a2. The cooling water introducing port 17a1 is, as understandable from FIGS. 1 and 2, connected via a water conduit W1 to a cooling water discharge port of the unillustrated water jacket of the engine body 3.

Further, the cooling water discharge port 17a2 is connected via a water conduit W2 to the car room heater 9. Then, the car room heater 9 is connected via a water conduit W3 to an unillustrated cooling water introducing port of the water jacket of the engine body 3.

Accordingly, the cooling water of the water jacket arrives at the combustion heater 17 via the water conduit W1 and is warmed therein. Thereafter, the warmed water arrives at the car room heater 9 via the water conduit W2 from the combustion heater 17 and is thermally exchanged as a heat medium of the car room heater 9, thereby blowing hot air into the car room. The cooling water, of which the temperature decreases due to the heat exchange, flows back to the water jacket via the water conduit W3. Thus, the cooling water is circulated between the engine body 3, the combustion heater 17 and the car room heater 9 via the water conduits W1–W3. Note that the cooling water is circulated by an unillustrated water pump for the engine during the driving of the engine and also circulated, during non-driving of the engine, by an electrically-driven water pump W1a separated from the engine-oriented water pump. Hence, the car room heater 9 works also when the engine I is not operated.

(Other Components of Combustion Heater 17)

Note that the combustion chamber body 43 includes, in addition to the above-mentioned, an air blow fan 45 and an unillustrated CPU dedicated to the combustion heater 17, and the combustion heater 17 is properly operated by the CPU, whereby flames F are formed in the combustion chamber 17d.

(Hybrid-Oriented Trans-Axle II)

Next, a hybrid-oriented Trans-axle II for the engine I will be explained.

The hybrid-oriented Trans-axle II is roughly constructed of an electric motor 101, a generator 103, a power imparting mechanism 105 and a deceleration mechanism 107.

It is a main period till the vehicle travels in a low-speed region since the vehicle has started traveling that the electric motor 101 operates. During a transition period for which the vehicle is accelerated from the low-speed region, the vehicle travels by cooperation of the engine I with the electric motor 101, i.e., by mutual action between the engine I and the electric motor 101. The electric motor can be, however, driven in all speed regions as the necessity arises, and this may be applied to the engine I.

(Electric Motor 101)

The engine I is the principal power source of the hybrid car, and by contrast the electric motor 101 functioning as the sub-power source is connected to a front wheel 109 of the vehicle through the deceleration mechanism 107. Hence, the power of the electric motor 101 is transferred to the front wheel 109 of the vehicle via the deceleration mechanism 107. Further, the deceleration mechanism 107 is also connected to the engine I through the power imparting mechanism 105, and therefore the power of the engine I is transferred to the front wheel 109 of the vehicle likewise via the deceleration mechanism 107.

(Generator 103)

The generator 103 for generating the electric power generates the electric power for charging a battery serving as a driving source of the electric motor 101.

(Power Imparting Mechanism 105)

The power imparting mechanism 105 is a connection mechanism for connecting coaxially detachably a driving shaft of the engine I to a driving shaft of the electric motor 101. The power imparting mechanism 105, when the vehicle is driven by only the engine I and when driven by only the electric motor 101, connects with only one power source operated, thereby imparting the power of the power source operated to the deceleration mechanism 107. The power imparting mechanism 105, when driven by both of the power sources, imparts the power of these two power sources to the deceleration mechanism 107. Further, the power imparting mechanism 105 operates also the generator 103.

(Deceleration Mechanism 107)

As known well, the deceleration mechanism 107 is a mechanism for decelerating a rotating speed and provided on the driving shaft of the vehicle.

(Operation Control Starting Execution Routine of Combustion Heater 17)

Next, an operation control starting execution routine of the combustion heater 17 will be explained referring to FIG. 3.

This routine is programmed for operating the combustion heater 17 when the engine I stops, and consists of steps in S101–S109 which will be hereinafter described. Further, each of programs, described hereinafter, constituting a routine as well as the above-mentioned routine are stored in a ROM of the ECU 46. Moreover, the processes in respective steps are all executed by the CPU of the ECU 46.

Note that the reference symbol "S" designates the step, and, for instance, step 101 is expressed by S101 in an abbreviated form.

To start with, the CPU judges in S101 whether or not a reducing process request condition of the catalyst 39 is established.

The reducing process request condition of the catalyst 39 is established when the catalyst 39 absorbs a nitrogen oxide and approximates a state of saturation. What can be considered as a method of judging whether or not the reducing process request condition of the catalyst 39 is established, may be a method (1) of judging based on whether or not an operating time of the engine I elapses over a predetermined time, a method (2) of judging based on whether or not an output of an outlet NOx sensor 39c provided in rear of the catalyst 39 increases over a predetermined value, and a method (3) of judging based on whether or not an integrated value of a quantity of the fuel supplied to the engine I comes to a predetermined value or larger. The predetermined time and predetermined values given above are values becoming indexes for indicating that the reducing process request condition of the catalyst 39 is established when, e.g., the operating time of the engine I exceeds the value of the predetermined time, and might be different depending on classifications of the engines and the types of the cars.

If judged to be affirmative in S101, the CPU proceeds to S102. Whereas if judged to be negative, this routine comes to an end.

In S102, the engine I is halted. This is because the reducing process request condition has already been established in S101, and, with the catalyst 39 having absorbed the nitrogen oxide and approximated the state of saturation, NOx can not be therefore occluded even if the exhaust gas of the engine I is further flowed to the catalyst 39.

Furthermore, this judgement of S101 may be made at any timings irrespective of whichever speed region the hybrid car might be. Namely, the reason why so is that the vehicle in accordance with the first embodiment is the hybrid car which can travel by the two kinds of driving sources, i.e., the engine and the electric motor, and still can therefore travel by the electric motor instead of the engine I even if the engine I stops. Hence, it never happens that the car halts even if the engine I stops in the case of its being in such a speed region that the hybrid car travels normally by only the engine I. A speed region, e.g., a region of an intermediate speed or higher may be exemplified as the speed region where the hybrid car travels normally by only the engine I.

Note that an implication of "stopping the engine I" may embrace, excepting a meaning that the engine I having operated so far is set in the stop state, a case where the engine I does not yet work at a stage before shifting this routine, e.g., a case where the hybrid car starts traveling by dint of the electric motor 101.

The CPU judges in S103 whether or not an operation executing condition of the combustion heater 17 is established when the engine I is in the stop state. This judgment is, in other words, a process of judging whether or not the catalyst 39 is at over an activation temperature enough to execute the reducing process. If judged to be affirmative in S103, the CPU proceeds to step S104. Whereas if judged to be negative, the CPU diverts to S107.

In S104, the intake throttle valve 70 is completely closed. It is because, with respect to the connecting points C1 and C2 between the mainstream pipe 29 and the air supply passageway 33 and the combustion gas discharge passageway 35 through which to connect the heater 17 to the mainstream pipe 29 during the operation of the combustion heater 17, the combustion gas of the combustion heater 17 is prevented from flowing toward the connecting point C1 from the connecting point C2 positioned downstream.

In S105, the EGR passageway 90 is allowed to communicate by fully opening the EGR valve 92. This is because the combustion gas of the combustion heater 17 can be introduced to the catalyst 39 even when unillustrated engine intake/exhaust ports are closed due to the halt of the engine I.

In S106, the CPU executes the control of the operation of the combustion heater 17 for the reducing process of the catalyst 39. At this time, a combustion state of the combustion heater 17 is adjusted so that the combustion gas emitted from the combustion heater 17 contains a great quantity of reduction components such as hydrocarbon and carbon monoxide etc. That is, an air-fuel ratio (A/F) of the combustion gas is enriched. This intends to purge the exhaust gas of NOx at a high efficiency. Upon an end of processing in S106, this routine is thereafter repeated according to the necessity.

To get the discussion back to S103, when proceeding to S107 if judged to be negative in S103, the intake throttle valve 70 is completely closed in S107 as in the case of S104, and the CPU advances to S108.

In 5108, the EGR passageway 90 is made communicative by fully opening the EGR valve 92 as in S105.

In S109, the operation of the combustion heater 17 is controlled for raising the temperature of the catalyst 39. At this times the combustion state of the combustion heater 17 is adjusted so that the combustion gas emitted from the combustion heater 17 does not contain a great quantity of reduction components such as hydrocarbon and carbon monoxide etc. That is, the air-fuel ratio (A/F) of the combustion gas is made lean. The reducing process request condition of the catalyst 39 has been established (see S101), and nevertheless the catalyst 39 does not reach the activation temperature (due to the negative judgement in S103). Therefore, to begin with, the temperature of the catalyst 39 is raised up to the activation temperature, it is required that the catalyst 39 be thereby capable of executing the reducing process. Then, till the catalyst 39 reaches the activation temperature or higher, this routine is repeated in order to execute the judging process in S103.

(Recovery from S-Poisoning of Occlusion Reduction type Lean NOx Catalyst, and NOx Reproduction Control Routine)

Figure 4:
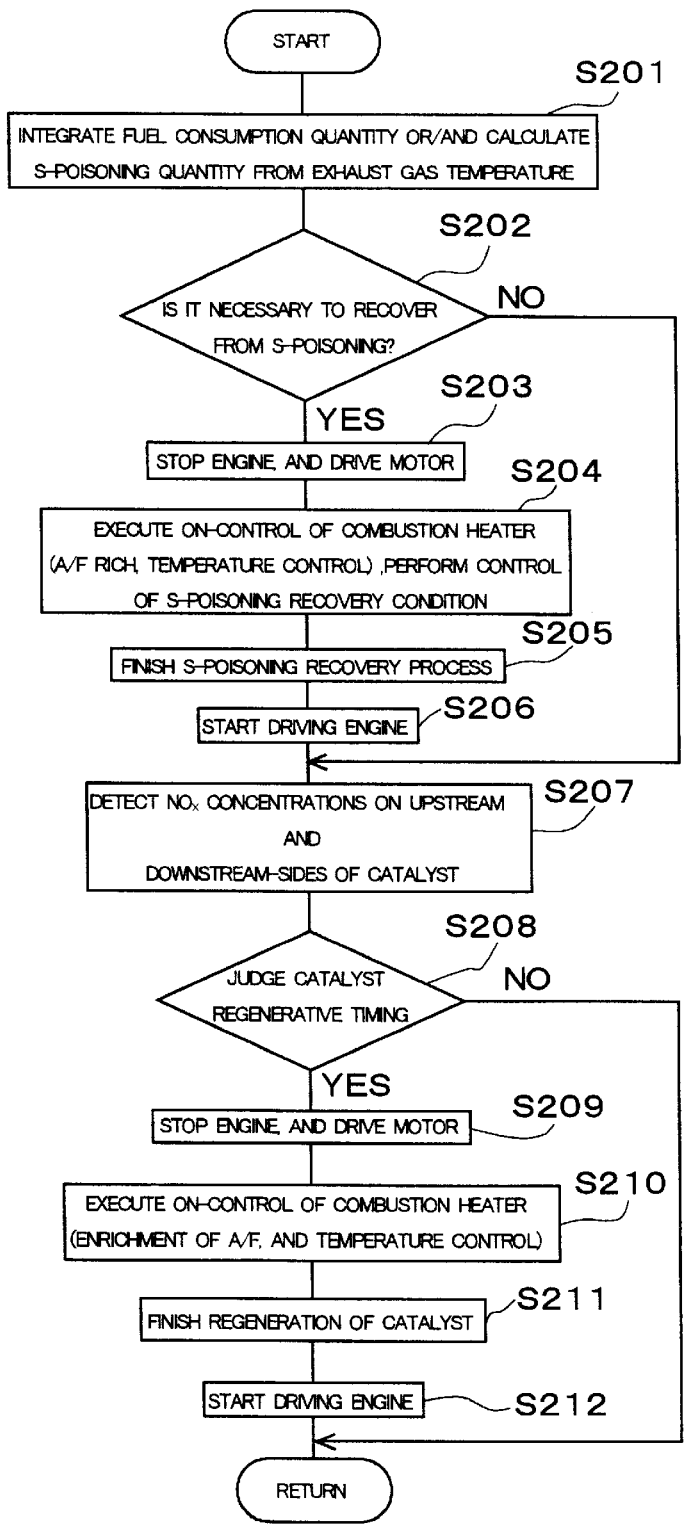
FIG. 4 is a diagram showing a regeneration control routing of an occlusion reduction type lean NOx catalyst in the internal combustion engine having the combustion heater in the first embodiment of the present invention.

Next, a recovery from S-poisoning of the occlusion reduction type lean NOx catalyst, and a NOx reproduction control routine will be explained referring to FIG. 4. This routine consists of steps in S201–S212.

When the processing shifts to this routine, in S201, the CPU integrates a consumption quantity of the fuel supplied to the engine I and calculates an S-poisoning quantity, based on this integrated value. This is because the S-poisoning quantity increases in proportion to the consumption quantity of the fuel. It is therefore presumed that if the consumption quantity of the fuel is a certain specified quantity, there must be an S-poisoning quantity corresponding thereto. Hence, if a predetermined quantity of fuel is consumed, the recovery from the S-poisoning of the lean NOx catalyst 39 is sequentially carried out on the assumption of having reached such a quantity that the recovery from the S-poisoning of the lean NOx catalyst 39 should be done correspondingly.

A RAM (Random Access Memory) of the ECU 46 is temporarily stored with this integrated value as an integrated value of the quantity of the fuel supplied since the operation of the fuel pump has been started. Then, this integrated value is fetched to the CPU of the ECU 46 as the necessity arises. Note that the S-poisoning quantity may be calculated based on not only the integration of the fuel consumption quantity but also an exhaust gas temperature measured by the temperature sensor 39b or may be calculated based on both of them.

In S202, the CPU judges whether or not the recovery from the S-poisoning of the lean NOx catalyst 39 is required to be done based on the S-poisoning quantity calculated in S201. If judged to be affirmative in S202, the processing proceeds to S203. Whereas if judged to be negative, the processing diverts to S207.

Since the integrated quantity of the S-poisoning increases as the recovery from the S-poisoning of the lean NOx catalyst 39 is needed, in S203 the engine I stops and the vehicle is driven by the electric motor 101 in order to prevent a further increase of the S-poisoning.

In S204, the combustion heater 17 is controlled ON, and the exhaust gas therefrom is flowed to the exhaust pipe 42 via the EGR passageway 90, thereby increasing an engine exhaust temperature. At the same time, the air-fuel ratio of the combustion heater 17 is enriched, thus creating an environment for recovering from the S-poisoning of the lean NOx catalyst 39. The reason for this is that an enrichment and a rise in the temperature of the atmosphere of the exhaust system in which the catalyst 39 is provided, are needed for the recovery from the S-poisoning. Note that the settlement of the environment described above is for convenience called the control for obtaining a condition for the recovery from the S-poisoning.

In S205, the recovering process from the S-poisoning of the catalyst 39 is finished.

The environment for permitting the drive of the engine to start is settled with the end of the recovering process from the S-poisoning in S205, and hence the drive of the engine is started in S206.

In S207, NOx concentrations at the upstream side and the downstream side of the catalyst 39 are detected respectively by the inlet NOx sensor 39a and the outlet NOx sensor 39c.

In S208, the CPU judges whether or not the catalyst 39 should be reduced, in other words, whether or not the catalyst 39 is at its regenerative timing.

If judged to be affirmative in S208, the processing proceeds to S209. Whereas if negated, this routine comes to an end. This gives an implication that this routine is a routine for regenerating the catalyst, and hence, even if the regeneration is unnecessary, there is no meaning of continuing the execution of the routine.

In S209, the catalyst 39 comes to a more saturated state with NOx as the regeneration of the catalyst 39 is more needed, and consequently the electric motor 101 is driven with a halt of the engine I in order to prevent a further increase of Nox.

In S210, the combustion heater 17 is controlled ON, and the temperature is controlled so that a temperature of the atmosphere of the exhaust system rises as well as enriching the air-fuel ratio of the combustion gas.

In S211, the regeneration of the catalyst is finished.

In S212, with the catalyst regenerating process being finished in S211, then drive of the engine is started, and thereafter this routine is repeated according to the necessity.

What has been described so far is the exhaust emission control system of the hybrid car in the first embodiment.

Operations and Effects of First Embodiment

Next, operations and effects of the first embodiment will be explained.

With the establishment of the reducing process request condition of the catalyst 39, when the engine I is in the stop state, the combustion heater 17 operates. Thereupon, the air entering the intake device 5 from the air cleaner 13 via the following routes arrives at the exhaust device 7.

At a stage (1) of this route, the air entering the upstream-side connecting pipe 25 of the intake pipe 23 from the air cleaner 13, normally flows toward the intake throttle valve 70 of the mainstream pipe 29 via the compressor 15a of the turbo charger 15 and via the inter cooler 19. The intake throttle valve 70 is, however, closed as described in S104 of the flowchart in FIG. 3, and therefore the air diverges at the connecting point C1 to the air supply passageway 33.

A stage (2) is that the air entering the air supply passageway 33 is flowed into the combustion chamber body 43 of the combustion heater 17.

At a stage (3), the air entering the combustion chamber body 43 is supplied to the combustion chamber 17d of the combustion chamber body 43, as the air for burning the combustion fuel sent via the fuel supply pipe 17e. The air, after being burned, turns out a combustion gas and is discharged into the combustion gas discharge passageway 35.

A stage (4) is such that the combustion gas flowing into the combustion gas discharge passageway 35 thereafter diverges at the connecting point C2 of the mainstream pipe 29 into the mainstream pipe 29. At this time, the intake throttle valve 70 remains closed, and hence the combustion gas flows toward the engine body 3.

At a stage (5), the combustion gas flowing into the mainstream pipe 29, with the engine I remaining halted and therefore the intake port or/and the exhaust port being closed, does not enter the cylinders of the engine body 3 but enters the EGR passageway 90 through which the intake manifold 21 is connected to the exhaust manifold 37. At this time, the EGR valve 92 is opened as explained in S105 of the flowchart in FIG. 3, and therefore the combustion gas arrives at the exhaust manifold 37 via the EGR valve 92 and flows to the catalyst 39 via the turbine 15b of the exhaust pipe 42, wherein the catalyst 39 is thereby warmed.

At a final stage (6), the combustion gas having warmed the catalyst 39 is thereafter discharged outside the engine via the silencer 41.

As described above, the engine I is provided with the EGR 88, including as its components the EGR passageway 90 and the EGR valve 92, for recirculating the exhaust gas of the engine I from the exhaust pipe 42 to the intake pipe 23. When required to operate the combustion heater 17 with the engine I being in the stop state, the EGR 88 sends the combustion gas emitted by the combustion heater 17 to the exhaust pipe 42 from the intake pipe 23 via the EGR passageway 90. Accordingly, even when the engine I is in the stop state, the combustion gas of the combustion heater 17 flows to the catalyst 39 of the exhaust pipe 42 via the EGR passageway 90. Therefore, when the engine I operates, the catalyst 39 can be previously warmed up to a temperature enough to sufficiently effectively function. Besides, if the engine I halts at a stage that an elapse of time is not so long after the engine has been once started, i.e., if the catalyst is not cooled and in a comparatively high temperature region because of the engine I, though in the halt at present, having rotated at a predetermined number of revolutions somewhat anterior to this halt or because of having received a load over a predetermined value, a catalyst bed temperature can be immediately raised up to the activation temperature or higher without increasing the output of the combustion heater 17.

Accordingly, after starting up the engine I, a purifying performance of the catalyst 39 is sufficiently enhanced, and hence, upon the start-up of the engine I, the exhaust gas emitted from the engine body 3 can be extremely effectively purified. In addition, the costs can be reduced with a simple structure owing to utilizing the existing EGR passageway.

In accordance with the first embodiment having the construction described above, for example, in such a speed region that the hybrid car travels by only the electric motor 101 while the engine I is not yet driven, the combustion gas emitted from the combustion heater 17 can be flowed into the catalyst 39. Hence, in the speed region where both of the electric motor 101 and the engine I are driven, and besides in a state where, at the initial stage of the engine I just starting its actuation, a temperature of the exhaust gas emitted from the engine I is still low, the catalyst temperature can be set high beforehand by the combustion heat evolved from the combustion heater 17. Therefore, the exhaust gas can be purified immediately when starting up the engine I. Besides, if the combustion state of the combustion heater 17 is adjusted so that the exhaust gas emitted from the combustion heater 17 contains proper amounts of hydrocarbon and carbon monoxide, it is feasible to purify the emission by the catalyst and to make the recovery from the S-poisoning of the lean NOx catalyst 39 without requiring the sub-injection in the prior art. Accordingly, a load on an engine fuel injection device can be reduced. Then, in the case of using the lean NOx catalyst, this catalyst purges the nitrogen oxide from the exhaust gas when the exhaust system is in the lean state. Further, a reducing agent such as hydrocarbon and carbon monoxide etc can be supplied without requiring the sub-injection.

When the combustion heater 17 works and emits the combustion gas, the combustion gas flows to the mainstream pipe 29 via the combustion gas discharge passageway 35, at which time the mainstream pipe 29 is throttled by the intake throttle valve 70, and consequently the intake throttle valve 70 cuts off the mainstream pipe 29 of the intake pipe 23. Therefore, the combustion gas of the combustion heater 17 does not flow toward the air supply passageway 33 from the combustion gas discharge passageway 35 along the mainstream pipe 29. Namely a back flow does not occur. Then, at this time the EGR valve 92 of the EGR passageway 90 opens, and consequently the combustion gas of the combustion heater 17 all flows to the exhaust pipe 42 via the EGR passageway 90. Accordingly, the catalyst 39 provided in the exhaust pipe 42 can be sufficiently warmed at a high efficiency.

Next, the discussion focuses on the case where the engine I operates.

If the engine I is not yet sufficiently warmed up, the EGR valve 92 is closed. With this operation, the high-heat combustion gas of the combustion heater 17 enters the cylinders of the engine body 3, whereby the warm-up of the engine I is speeded up.

Further, in the case where the engine I is sufficiently warmed up, the EGR valve 92 is opened. This is because EGR 88 performs an essential function of recirculating the exhaust gas for the reason of the engine I having been sufficiently warmed up.

(Other Operations and Effects)

In the first embodiment, the air supply passageway 33 and the combustion gas discharge passageway 35 of the combustion heater 17 communicate with the mainstream pipe 29, and an effect of decreasing noises can therefore be expected.

Further, the warm-up is speeded up by utilizing the combustion gas from the combustion heater 17, which emits almost no smoke, in other words, contains no carbon. The carbon is never therefore adhered to the internal wall surface of the cylinder, and hence an improvement of durability of the engine I can be expected. Then, the combustion gas emitting, as mentioned above, almost no smoke from the combustion heater 17 is utilized without enriching the atmosphere of the exhaust system by applying the external load onto the engine I in order to raise the exhaust gas temperature for the purpose of activating the catalyst 39 and recovering from the S-poisoning of the lean NOx catalyst 39, and it therefore never happens that a large quantity of particulate matters are produced.

SECOND EMBODIMENT

The exhaust emission control system of the hybrid car in a second embodiment will be described with reference to FIGS. 5–7.

The followings are differences of the second embodiment from the first embodiment. A difference (1) is that the heater branch pipe 31 is connected to the upstream-side connecting pipe 25, instead of being connected to the mainstream pipe 29 of the downstream-side connecting pipe 27 in the first embodiment. A difference (2) is a branch pipe 95 provided midways of the combustion gas discharge passageway 35 and extending downstream of the intake throttle valve 70. A difference (3) is a three-way valve 97 provided, as a valve device which opens only when the combustion heater is operated, at a diverging point of the combustion gas discharge passageway 35 to the branch pipe 95. Therefore, the same components are marked with the like numerals, and their explanations are omitted.

Figure 5:
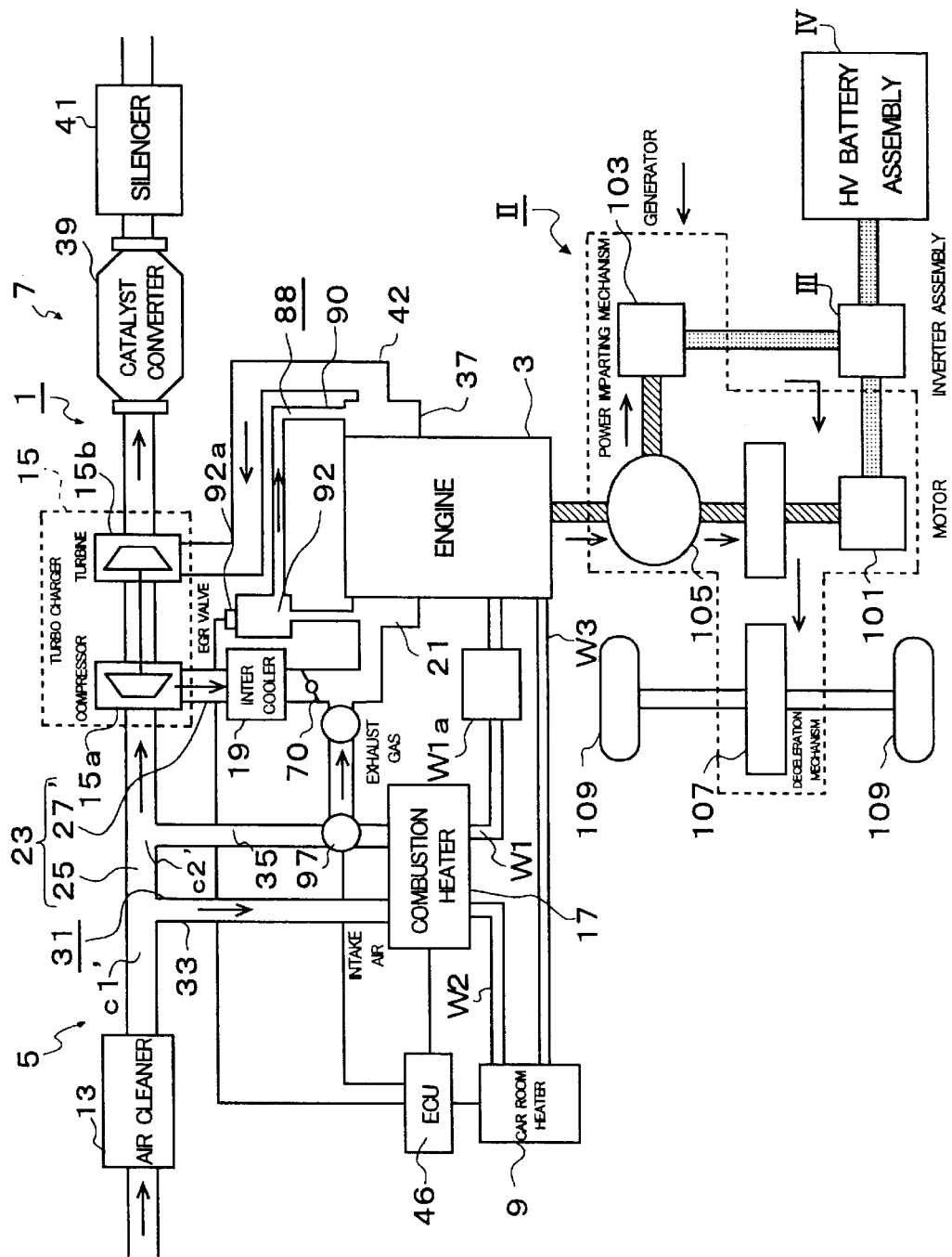
FIG. 5 is a schematic diagram showing a construction the internal combustion engine having the combustion heater in a second embodiment of the present invention.

As shown in FIG. 5, the heater branch pipe 31 is connected to the upstream-side connecting pipe 25, whereby a U-shaped bypass passageway positioned upstream of the compressor 15a is formed of the heater branch pipe 31 including the air supply passageway 33 and the combustion gas discharge passageway 35 which extend from the combustion heater 17. Hence, according to the second embodiment, the pipe corresponding to the downstream-side connecting pipe 27 explained in the first embodiment, is constructed of only an L-shaped downstream connecting pipe 27' for connecting the compressor 15a to the intake manifold 21, which corresponds to the mainstream pipe 29 described in the first embodiment. Further, connecting points, at which the air supply passageway 33 and the combustion gas discharge passageway 35 of the heater branch pipe 31 are connected to the upstream-side connecting pipe 25, are designated by reference symbols C1' and C2', respectively.

(Three-Way Valve 97)

Figure 6:
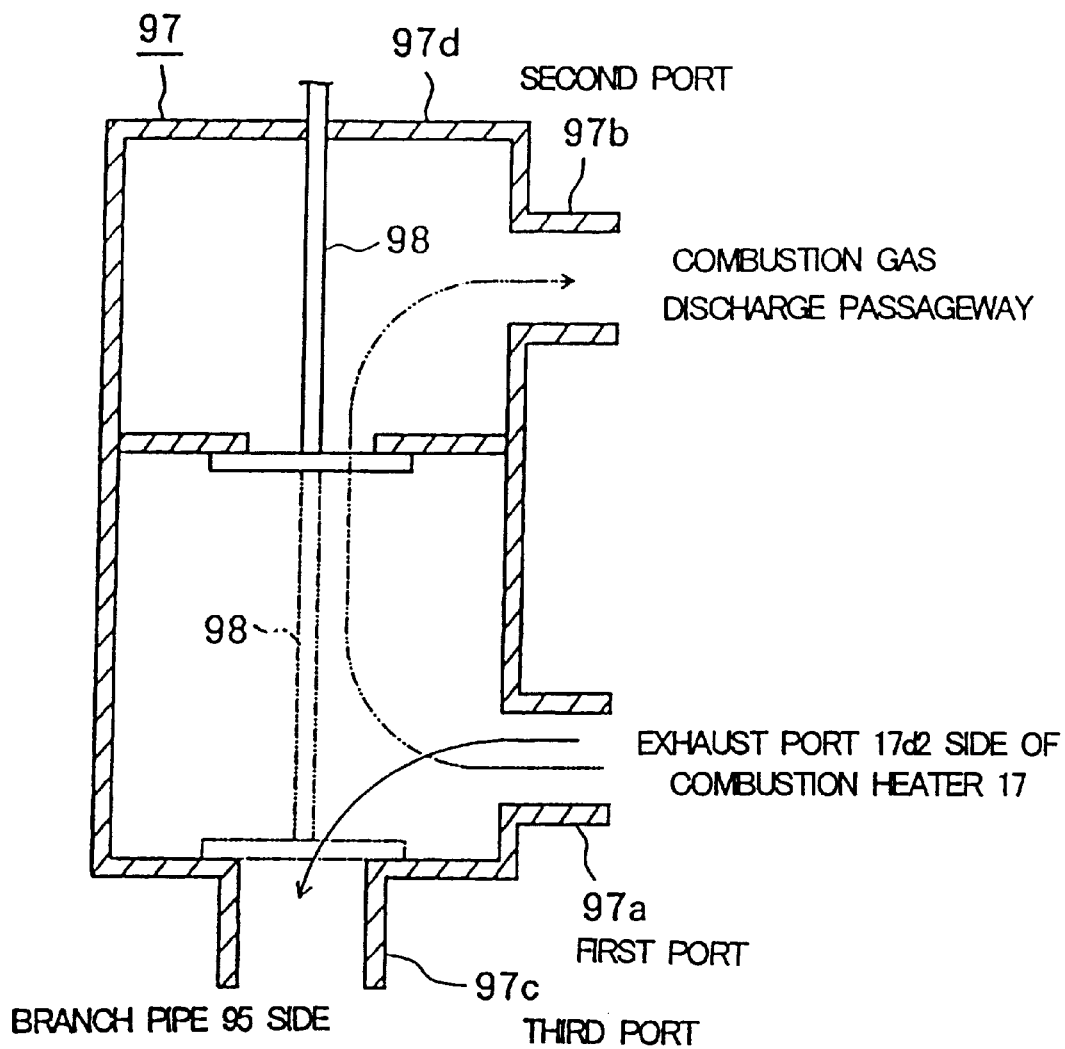
FIG. 6 is an explanatory diagram schematically showing a three-way valve.

On the other hand, the three-way valve 97 takes a configuration as illustrated in FIG. 6.

The three-way valve 97 has such a geometry that a first port 97a as one of three ports thereof is connected to the exhaust gas discharge port 17d2 of the combustion heater 17, a second port 97b as one of the two remaining ports is connected to the combustion gas discharge passageway 35, and a third port 97c as the other of the remaining ports is connected to the branch pipe 95. That is, the three-way valve 97 is positioned between the combustion heater 17, the combustion gas discharge passageway 35 and the branch pipe 95. A case body 97d of the three-way valve 97 encases a valve member 98 moved in a longitudinal direction of the case body 97d by an operation of an unillustrated diaphragm. This valve member 98, corresponding to moving positions within the case body 97d of the valve member 98, makes the two ports among three ports, i.e., the first port 97a and the second port 97b communicate with each other, and the first port 97a and the third port 97c communicated with each other (see an arrowhead of the two-dotted chain line, and an arrowhead of the solid line in FIG. 6). Then, when the first port 97a communicates with the second port 97b, the third port 97c is closed. When the first port 97a communicates with the third port 97c, the second port 97b is closed.

More specifically, when required to operate the combustion heater 17 with the engine I being in its stop state, the valve member 98 moves as indicated by the solid line so that the first port 97a communicates with the third port 97c. In this case, the combustion gas produced when the combustion is effected in the combustion heater 17, after flowing via the first and third ports 97a, 97c, flows via a part of the downstream-side connecting pipe 27' and the EGR passageway 90, and before long arrives at the catalyst 39 of the exhaust pipe 42. Hence, it is possible to have the catalyst 39 reach the activation temperature before starting up the engine I and, therefore, the catalyst 39 functions effectively immediately after starting up the engine I.

Further, the three-way valve 97, when the engine I is in the stop state and when the electric motor 101 is in driving state, introduces the combustion gas emitted from the combustion heater 17 into the EGR passageway 90 via the branch pipe 95, or introduces the combustion gas into the combustion gas discharge passageway 35 by cutting off the flow to the branch pipe 95, thereby to hinder direct introduction of the combustion gas into the EGR passageway 90. Hence, the three-way valve 97 may be defined as a mechanism for introducing the combustion gas into the EGR passageway 90.

(Operation Control Starting Execution Routine of Combustion heater 17)

Next, an operation control starting execution routine of the combustion heater 17 will be explained referring to FIG. 7.

Figure 3:
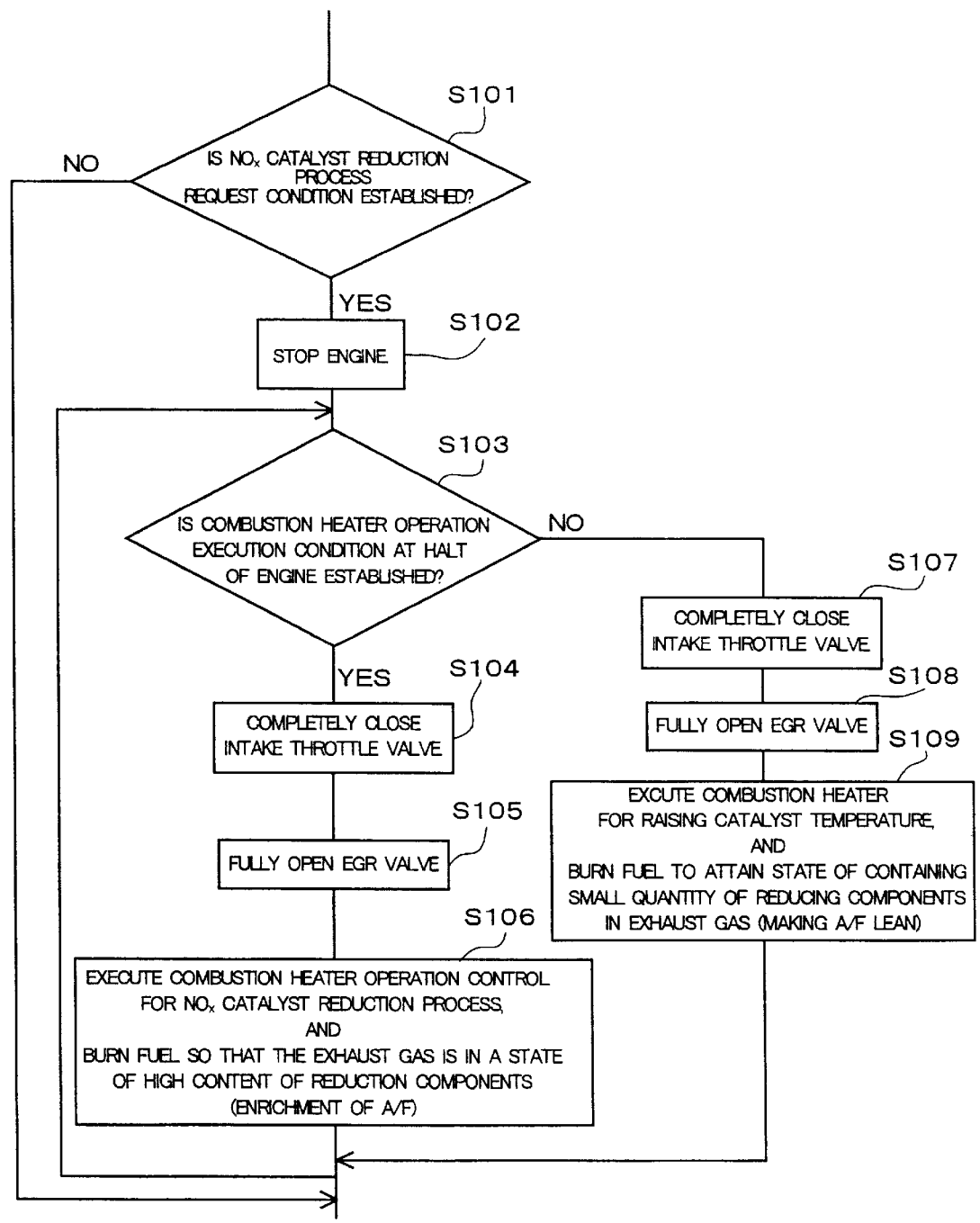
FIG. 3 is an operation control starting execution routine of the combustion heater in the first embodiment.
Figure 8:
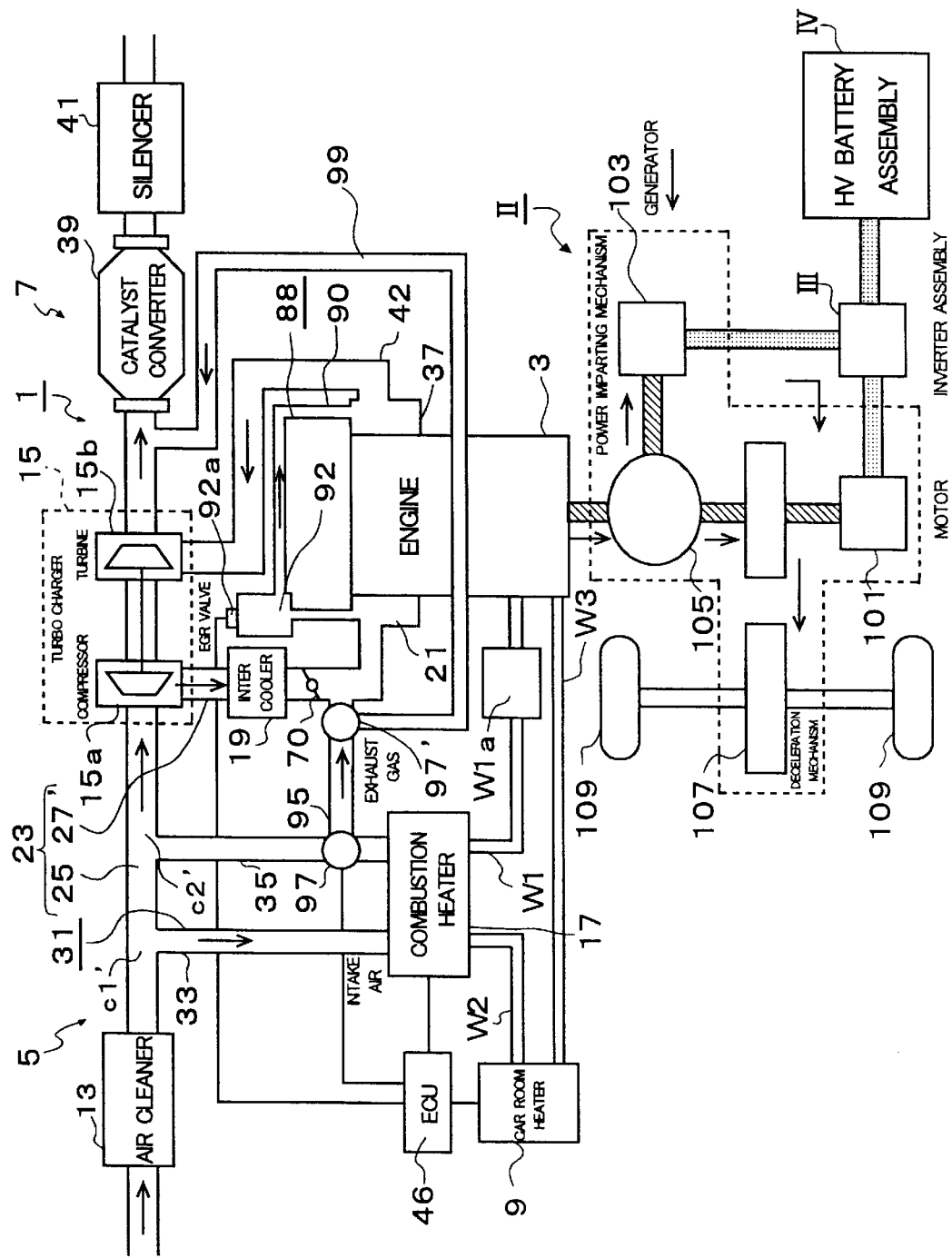
FIG. 8 is a schematic diagram showing a construction the internal combustion engine having the combustion heater in a third embodiment of the present invention.

A different point of this routine from the operation control starting execution routine of the combustion heater 17 shown in FIG. 3, is that step S104a of making the first port 97a communicate with the third port 97c by moving the valve member 98 of the three-way valve 97 and thereby switching over a flow of the combustion gas emitted from the combustion heater 17 to the downstream-side of the compressor 15a, is added to between S104 and S105 in FIG. 3., and that step S107a of executing the same process as S104a is added to between S107 and S108 in FIG. 8. Hence, other identical steps are marked with the same symbols, and the explanations thereof are omitted.

Operations and Effects of Second Embodiment

Next, operations and effects of the second embodiment will be discussed.

To begin with, the operation and the effect when the engine I is in the stop state will be described.

Upon the operation of the combustion heater 17, the air entering the intake device 5 from the air cleaner 13 along the following route flows to the exhaust device 7.

Figure 7:
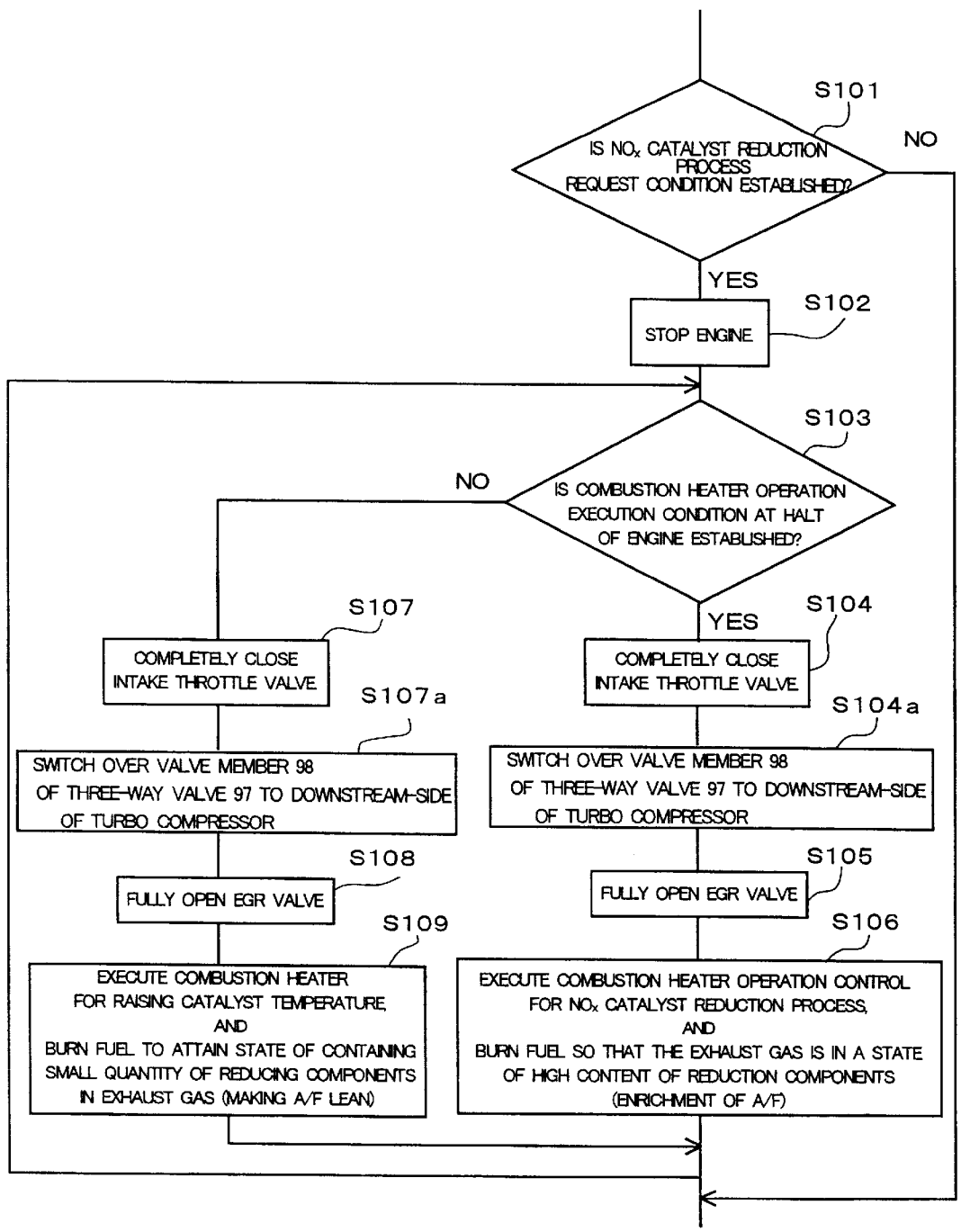
FIG. 7 is an operation control starting execution routine of the combustion heater in the second embodiment.

A stage (1) is that the air entering the upstream-side connecting pipe 25 of the intake pipe 23 from the air cleaner 13 normally flows toward the intake throttle valve 70 of the downstream-side connecting pipe 27' via the compressor 15a of the turbo charger 15 and the inter cooler 19 but diverges, with the intake throttle valve 70 being closed as done in S104 in FIG. 7, at the connecting point C1' to the air supply passageway 33.

At a stage (2), the air flowing into the air supply passageway 33 is sent into the combustion chamber body 43 of the combustion heater 17.

A stage (3) is that the air entering the combustion chamber body 43 is used as the air for burning the combustion fuel supplied from the fuel supply pipe 17e and, after being burned, turns out to be a combustion gas, and this combustion gas flows toward the three-way valve 97 provided at a diverging point of the combustion gas discharge passageway 35 to the branch pipe 95.

At a stage (4), the three-way valve 97 is in a state where the valve member 98 moves to make the first and third ports 97a and 97c communicate with each other, and hence the combustion gas flows forward through the branch pipe 95 and, while being guided along the branch pipe 95, enters a portion, disposed more downstream than the intake throttle valve 70, of the downstream-side connecting pipe 27'.

A stage (5) is that the combustion gas entering the downstream-side connecting pipe 27', because of the engine I being on the halt and of the intake port or/and the exhaust port being closed, flows into the EGR passageway 90 via the intake manifold 21. At this time, the EGR valve 92 remains opened as shown in S105 in FIG. 7, and consequently the exhaust gas arrives at the exhaust manifold 37 via the EGR passageway 90 and before long enters the exhaust pipe 42. Thereafter, the exhaust gas flows down to the catalyst 39 of the exhaust pipe 42, and warms the catalyst 39.

According to the second embodiment, as in the first embodiment, the combustion gas emitted from the combustion heater 17 is likewise sent to the exhaust pipe 42 from the intake pipe 23, so that the combustion gas from the combustion heater 17, even when the engine I is in the stop state where the intake port or/and the exhaust port of the engine I are still closed, flows to the exhaust pipe 42 via the EGR passageway 90. Therefore, even if the combustion gas is discharged from the combustion heater 17 upon operating the combustion heater 17 when the engine I is in the halt state, the intake pipe 23 is not filled with the combustion gas. Accordingly, a thermal damage of the high heat held by the combustion gas of the combustion heater 17, is not exerted to the intake system structures.

Furthermore, the combustion gas of the combustion heater 17 is led by the branch pipe 95 more downstream than the portions, provided with the compressor 15a and the inter cooler 19, of the intake pipe 23, and this may therefore be the same as substantially cutting off the flow of the combustion gas through the combustion gas discharge passageway 35, and the combustion gas does not flow to the upstream-side connecting pipe 25 from the connecting point C2' of the combustion gas discharge passageway 35 to the upstream-side connecting pipe 25. Accordingly, the combustion gas of the combustion heater 17 does not flow toward the connecting point C1' of the air supply passageway 33 to the intake pipe 23 from the connecting point C2' of the combustion gas discharge passageway 35 to the intake pipe 23. Namely the back flow does not occur. Then, in this case, as explained above, the EGR valve 92 of the EGR passageway 90 is kept open, so that the combustion gas of the combustion heater 17 all flows to the exhaust pipe 42 via the EGR passageway 90. Hence, the catalyst 39 provided in the exhaust pipe 42 is warmed beforehand at a high efficiency.

Described next is a case where the engine I is operated.

During a transition period for which the engine I is not yet sufficiently warmed up, viz., when a vehicle speed shifts to an intermediate speed from a low speed and, besides, when at the initial stage, the EGR valve 92 is closed, and the three-way valve 97 is opened to permit the flow of the combustion gas of the combustion heater 17 toward the branch pipe 95. With the operation being thus done, the high-heat combustion gas of the combustion heater 17 enters the cylinders of the engine body 3, thereby speeding up the warm-up of the engine I.

Further, when the engine I is sufficiently warmed up, the EGR valve 92 is opened, and the three-way valve 97 is opened to permit the flow of the combustion gas of the combustion heater 17 toward the combustion gas discharge passageway 35 (see an arrowhead of the two-dotted chain line in FIG. 6). This intends to execute the essential function of recirculating the exhaust gas by the EGR 88 as the warm-up of the engine I is enough, and is because there is no necessity for flowing the high-heat combustion gas emitted by the combustion heater 17 directly to the engine body 3 irrespective of the engine I being sufficiently warmed up.

Further, it is not when the engine I is started up at a low temperature but after the warm-up of the internal combustion engine has progressed to some extent that the EGR a passageway 90 defined as the exhaust gas recirculation passageway performs its essential function. It therefore never happens that the essential function of the EGR passageway 90 is impaired even when utilizing the EGR passageway 90 for raising the temperature of the catalyst 39, and on the contrary it may be said to be a extremely preferable mode because of utilizing the existing equipment.

Then, EGR passageway 90 is closed by operating the EGR valve 92 after start of the engine I, and the downstream-side connecting pipe 27' is throttled by controlling the intake throttle valve 70, thereby making it feasible to use all the combustion gas of the combustion heater 17 for improving a warm-up characteristic of the engine I.

THIRD EMBODIMENT

The exhaust emission control system of the hybrid car in a third embodiment will be described with reference to FIGS. 8–10.

The followings are differences of the third embodiment from the second embodiment. A difference (1) is a provision of a combustion gas passageway 99 diverging from the branch pipe 95 and extending anterior to the catalyst 39 of the exhaust pipe 42. A difference (2) is that a three-way valve 97' is added at a branch pipe 95 connecting point between the combustion gas passageway 99 and the branch pipe 95, and there are provided two pieces of three-way valves designated respectively by 97 and 97'. Hence, the same components are marked with the like numerals with an omission of their explanations.

(Combustion Gas Passageway 99)

The combustion gas passageway 99 serves to send the combustion gas, which comes from the combustion heater 17 and arrives at the branch pipe 95 via the three-way valve 97, towards anterior to the catalyst 39 without letting this combustion gas through the engine body 3 via the three-way valve 97'. Hence, regardless of the driving or non-driving of the engine I, it follows that the catalyst 39 is warmed directly by the combustion gas emitted from the combustion heater 17. Further, the combustion gas passageway 99 is utilized only for warming the catalyst 39 without its combustion heat escaping anywhere during a period for which the combustion gas passes through this passageway 99.

(Difference between Combustion Gas Passageway 99 and EGR passageway 90)

A difference between the combustion gas passageway 99 and the EGR passageway 90 is whether the heat is difficult to escape or not during the period of which the combustion gas giving the heat to the catalyst flows through each of these passageways.

These two passageways 99, 90 are the same in terms of flowing the combustion gas toward the catalyst 39 without letting it through the engine body 3. The combustion gas passageway 99 is, however, a passageway for directly sending the combustion gas towards anterior to the catalyst 39, whereby the catalyst 39 can be directly warmed.

By contrast, the EGR passageway 90 warms the catalyst 39 indirectly. To be more specific, the combustion gas which flows through the EGR passageway 90 must pass through the exhaust manifold 37 and the turbine 15b until the combustion gas arrives at the catalyst 39, and, therefore, the heat held by the combustion gas is absorbed by the exhaust manifold 37 etc when passing therethrough. For this reason, there might be assumed a case where the catalyst 39 is not warmed by the combustion gas flows through the EGR passageway 90 as compared with the combustion gas flows through the combustion gas passageway 99.

Further, on the occasion of warming the catalyst 39, the EGR passageway 90 can be used only when the engine I does not operate, and by contrast the combustion gas passageway 99 can be used without being restricted at all in terms of time, whether before or after the driving of the engine I.

(Three-Way Valve 97')

Only one difference of the three-way valve 97' from the three-way valve 97 is just a position where each of these valves is fitted, and the configurations thereof are the same. Hence, an explanation of the configuration of the three-way valve 97' is omitted.

Depending on the difference in the fitting position, however, points to which the first, second and third ports 97a, 97b, 97c are connected, are different from those in the case of the three-way valve 97. This three-way valve 97' is, however, used for switching over the flow of the combustion gas of the combustion heater 17, which has flowed from the tree-way valve 97, to the combustion gas passageway 99 or toward the engine body 3. Therefore the discussion will be emphasized on this switching process, however, the explanation of each of the points to which the first to third ports 97a–97c are connected is omitted.

In the case of the three-way valve 97' directing the flow of the combustion gas of the combustion heater 17 toward the combustion gas passageway 99, whether the engine I operates or not, this implies the case where the catalyst 39 does not yet reach the activation temperature. Before operating the engine, however, the EGR 88 can be utilized, and hence, in that case, whether to use the EGR 88 or the combustion gas passageway 99 might differ depending upon how much high the temperature of the catalyst 39 is.

Namely, when the catalyst temperature is not so low, the temperature thereof may be adjusted to gently reach the activation temperature by use of the EGR 88. When the catalyst temperature is extremely low, it may be increased promptly up to the activation temperature by use of the combustion gas passageway 99. The CPU judges which passageway is used for raising the catalyst temperature, based on detected values outputted from the respective sensors.

The three-way valve 97' works to introduce the combustion gas emitted by the combustion heater 17 into the combustion gas passageway 99 or to hinder the inflow of the combustion gas into the combustion gas passageway 99, at least when the engine I is in the halt state. Hence, the three-way valve 97' may be called an introduction mechanism for introducing the combustion gas into the combustion gas passageway 99.

(Operation Control Starting Execution Routine of Combustion Heater 17)

Next, an operation control starting execution routine of the combustion heater 17 will be explained by referring to FIG. 9.

A different point of this routine from the operation control starting execution routine of the combustion heater 17 shown in FIG. 7 is that S104, S104*a* and S105 in FIG. 7 are replaced with S103*a*', and that S107, S107*a* and 108 in FIG. 7 are replaced with S103*a* having the same content as S103*a*. Other identical steps are marked with the like symbols, and their explanations are omitted.

When shifting to S103*a* after executing the processes in S101 to S103, the combustion gas emitted from the combustion heater 17 is discharged anterior to the catalyst provided in the engine exhaust system by operating the three-way valve 97 and the three-way valve 97', and the processing proceeds to next S106.

To have the discussion back to S103, if judged to be negative in S103, and the processing proceeds to S103*a*'. In S103*a*' also, the combustion gas emitted from the combustion heater 17 is discharged anterior to the catalyst provided in the engine exhaust system by operating the three-way valve 97 and the three-way valve 97', and the processing proceeds to next S109.

Figure 9:
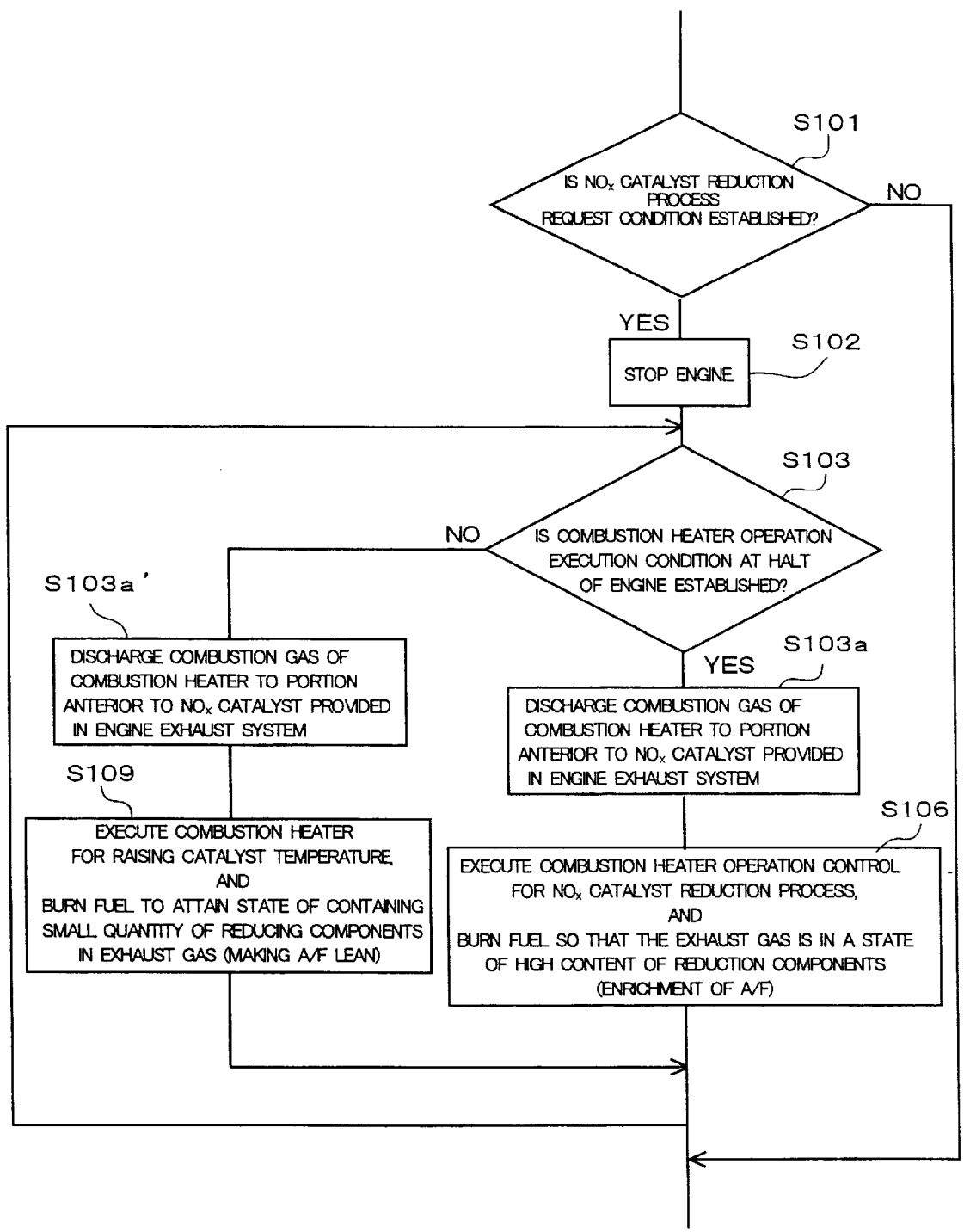
FIG. 9 is an operation control starting execution routine of the combustion heater in the third embodiment.
Figure 10:
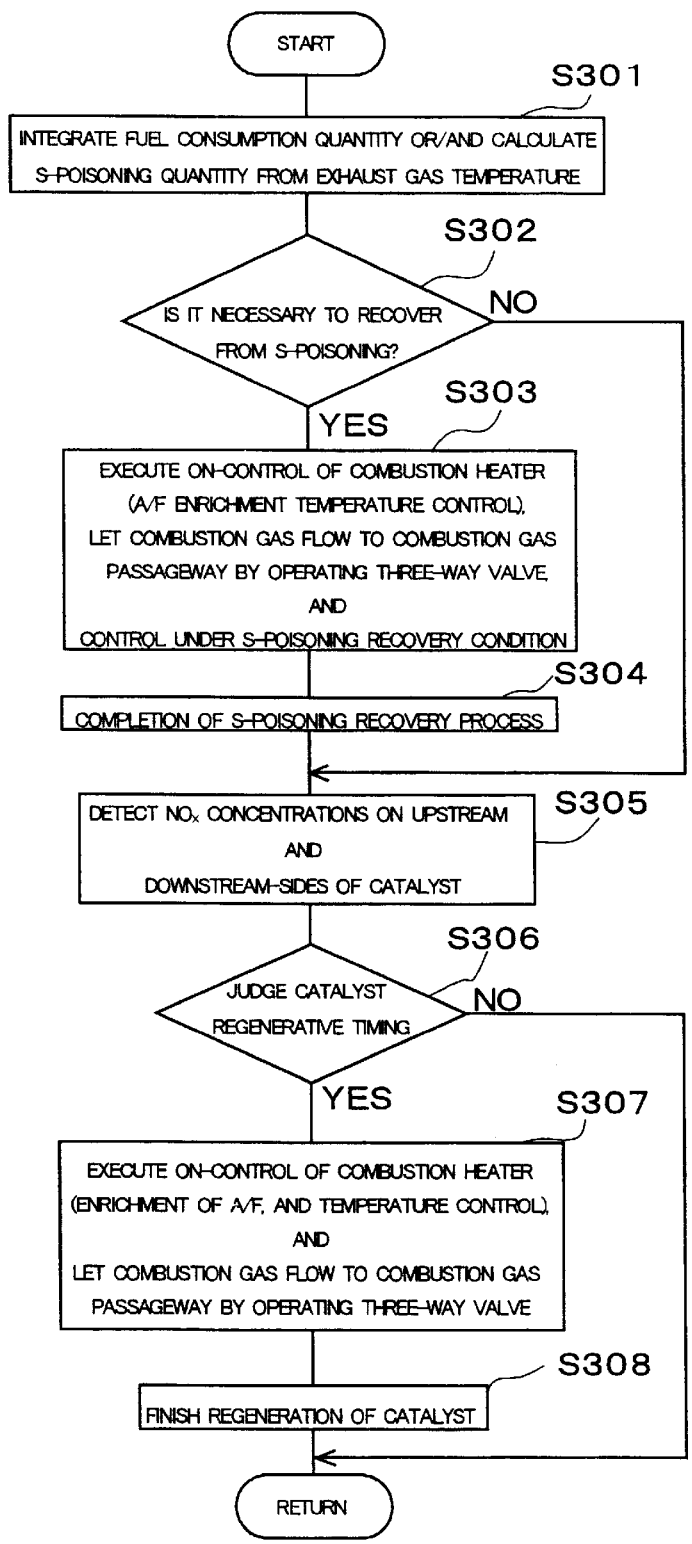
FIG. 10 is a diagram showing a regeneration control routing of the occlusion reduction type lean NOx catalyst in the internal combustion engine having the combustion heater in the third embodiment of the present invention.

Note that FIG. 9 shows the operation control starting execution routine of the combustion heater 17 when the engine I stops, however, when the engine I operates, the process in S102 may be replaced with a process when the engine I operates. Further, corresponding thereto, the process in S103 may be set to such a content of "judging whether or not the execution condition of the combustion heater 17 is established when the engine I operates."

(Recovery from S-Poisoning of Occlusion Reduction type Lean NOx Catalyst, and Reproduction Control Routine thereof)

Next, a reproduction control routine of the occlusion reduction type lean NOx catalyst will be explained by referring to FIG. 10. This routine consists of steps in S301–S308.

When the processing shifts to this routine, in S301, the CPU calculates an S-poisoning quantity of the NOx catalyst, based on an integrated value of a consumption quantity of the fuel supplied to the engine I. This is because the S-poisoning quantity increases in proportion to the consumption quantity of the fuel. It is therefore presumed that if the consumption quantity of the fuel is a certain specified quantity, there must be an S-poisoning quantity corresponding thereto. Hence, if a predetermined quantity of fuel is consumed, the recovery from the S-poisoning of the lean NOx catalyst 39 is sequentially carried out on the assumption of having reached such a quantity that the recovery from the S-poisoning of the lean NOx catalyst 39 should be done correspondingly.

The RAM (Random Access Memory) of the ECU 46 is temporarily stored with this integrated value as an integrated value of the quantity of the fuel supplied since the operation of the fuel pump has been started. Then, this integrated value is fetched to the CPU of the ECU 46 as the necessity arises. Note that the S-poisoning quantity may be calculated based on not only the integration of the fuel consumption quantity but also an exhaust gas temperature or may be calculated based on both of them.

In S302, the CPU judges whether or not the recovery from the S-poisoning of the lean NOx catalyst 39 is required to be done based on the S-poisoning quantity calculated in S301. If judged to be affirmative in S302, the processing proceeds to S303. Whereas if judged to be negative, the processing diverts to S305.

In S303, the combustion heater 17 is controlled ON to increase the engine exhaust temperature, and the air-fuel ratio of the combustion heater 17 is enriched, thereby creating an environment for recovering from the S-poisoning of the lean NOx catalyst 39 (note that the settlement of the environment described above is for convenience called the control for obtaining a condition for the recovery from the S-poisoning). It is because the recovery from the S-poisoning needs a high enrichment and a rise in the temperature of the atmosphere of the exhaust system in which the catalyst 39 is provided. Further, the combustion heater 17 is controlled ON, and the three-way valve 97' is operated, thereby letting the combustion gas of the combustion heater 17 flow to the combustion gas passageway 99.

In S304, the recovering process from the S-poisoning of the catalyst 39 is finished.

In S305, the inlet NOx sensor 39*a* and the outlet NOx sensor 39*c* detect NOx concentrations both on the upstream- and downstream-sides of the catalyst 39.

In S306, the CPU judges whether or not the catalyst 39 should be reduced, in other words, whether or not the catalyst 39 is at its regenerative timing. If judged to be affirmative in S306, the processing proceeds to S307. Whereas if negated, this routine comes to an end.

In S307, the combustion heater 17 is controlled ON, and the temperature is controlled so that a temperature of the atmosphere of the exhaust system rises as well as enriching the air-fuel ratio of the combustion gas. Further, the combustion heater 17 is controlled ON, and the three-way valve 97' is operated, thereby letting the combustion gas of the combustion heater 17 flow to the combustion gas passageway 99.

The catalyst regenerative process is finished in S308, however, this routine is thereafter repeated according to the necessity.

Operations and Effects of Third Embodiment

Next, operations and effects of the third embodiment will be explained.

In accordance with the third embodiment, in a speed region where both of the electric motor 101 and the engine I are driven, and besides in a state where, at the initial stage of the engine I just starting its actuation, a temperature of the exhaust gas emitted from the engine I is still low, the combustion gas of the combustion heater 17 is flowed directly to the catalyst 39 via the combustion gas passageway 99, and hence, when the engine I operates, the catalyst temperature can be set high beforehand by the combustion heat evolved from the combustion heater 17. Therefore, upon the start-up of the engine I, and the exhaust gas can be purified corresponding thereto. Besides, if the combustion state of the combustion heater 17 is adjusted so that the exhaust gas emitted from the combustion heater 17 contains a large amount of hydrocarbon and carbon monoxide, it is feasible to make the recovery from the S-poisoning of the lean NOx catalyst 39 without requiring the sub-injection used in the prior art. Then, since the occlusion reduction type lean NOx catalyst 39 is used, this catalyst purges the nitrogen oxide from the exhaust gas when the exhaust system is in the lean state.

FOURTH EMBODIMENT

Figure 11:
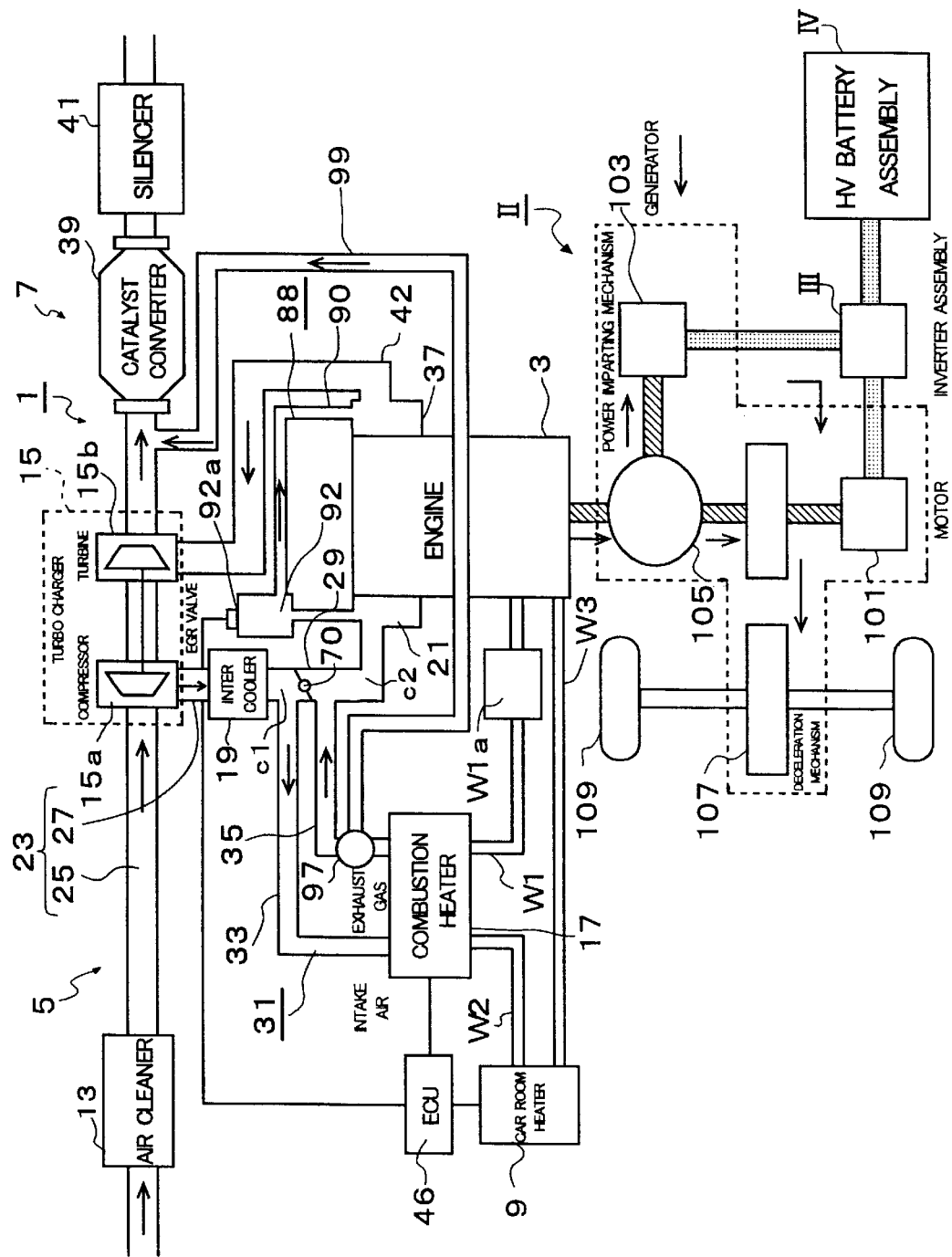
FIG. 11 is a schematic diagram showing a construction the internal combustion engine having the combustion heater in a fourth embodiment of the present invention.

The exhaust emission control system of the hybrid car in a fourth embodiment will be described with reference to FIG. 11.

The followings are differences of the fourth embodiment from the first embodiment. A difference (1) is that the combustion gas discharge passageway 35 is provided with the three-way valve 97. A difference (2) is a provision of the combustion gas passageway 99 extending anterior to the catalyst 39 of the exhaust pipe 42 from the three-way valve 97. Hence, other identical components are marked with the same symbols, and the explanations thereof are omitted.

Operations and Effects of Fourth Embodiment

In accordance with the fourth embodiment also, the high-heat combustion gas emitted from the combustion heater 17 is flowed via the three-way valve 97 to the combustion gas passageway 99, whereby this high-heat combustion gas flows directly to the catalyst 39. Therefore, the same operations and effects as those in the third embodiment are exhibited.

What is claimed is:

1. An exhaust emission control system of an internal combustion engine, used in a hybrid car traveled by two types of power sources of an internal combustion engine and an electronic motor, comprising:

a combustion device working as a separate device from said internal combustion engine;

a catalyst, provided in an exhaust passageway of said internal combustion engine, for purifying an exhaust gas emitted from said internal combustion engine;

a combustion gas passageway through which the combustion gas emitted from said combustion device passes toward said catalyst; and an introducing mechanism for the combustion gas to said catalyst via said combustion gas passageway when said internal combustion engine is in a stop state.

2. An exhaust emission control system of a hybrid car according to claim 1, wherein said combustion device is a combustion heater having a combustion gas discharge passageway for discharging the combustion gas to an intake system of said internal combustion engine.

3. An exhaust emission control system of a hybrid car according to claim 2, wherein said catalyst is a lean NOx catalyst.

4. An exhaust emission control system of a hybrid car according to claim 1, wherein said combustion gas passageway is an EGR (Exhaust Gas Recirculation) passageway, and said introducing mechanism is an EGR valve.

5. An exhaust emission control system of a hybrid car according to claim 1, wherein said introducing mechanism, when said internal combustion engine is in the stop state and when said electric motor is in a driving state, introduces the combustion gas to said catalyst via said combustion gas passageway.

\* \* \* \* \*